US008266047B2

(12) United States Patent
Galit

(10) Patent No.: US 8,266,047 B2
(45) Date of Patent: Sep. 11, 2012

(54) SYSTEM, METHOD, AND PROGRAM PRODUCT FOR FOREIGN CURRENCY TRAVEL ACCOUNT

(75) Inventor: Scott Galit, New York, NY (US)

(73) Assignee: Metabank, Sioux Falls, SD (US)

( * ) Notice: Subject to any disclaimer, the term of this patent is extended or adjusted under 35 U.S.C. 154(b) by 0 days.

(21) Appl. No.: 13/405,079

(22) Filed: Feb. 24, 2012

(65) Prior Publication Data

US 2012/0150719 A1   Jun. 14, 2012

Related U.S. Application Data

(60) Division of application No. 13/232,405, filed on Sep. 14, 2011, which is a continuation of application No. 12/554,659, filed on Sep. 4, 2009, now Pat. No. 8,024,242.

(60) Provisional application No. 61/094,328, filed on Sep. 4, 2008.

(51) Int. Cl.
*G06Q 40/00* (2012.01)
(52) U.S. Cl. ............ 705/37; 705/35; 705/38; 705/39
(58) Field of Classification Search ............ 705/35–39
See application file for complete search history.

(56) References Cited

U.S. PATENT DOCUMENTS

| | | | |
|---|---|---|---|
| 3,752,904 A | 8/1973 | Waterbury | |
| 4,247,759 A | 1/1981 | Yuris et al. | |
| 4,334,307 A | 6/1982 | Bourgeois et al. | |
| 4,439,636 A | 3/1984 | Newkirk et al. | |
| 4,449,040 A | 5/1984 | Matsuoka et al. | |
| 4,528,643 A | 7/1985 | Freeny, Jr. | |
| 4,532,416 A | 7/1985 | Berstein | |
| 4,577,061 A | 3/1986 | Katzeff et al. | |
| 4,625,276 A | 11/1986 | Benton et al. | |
| 4,677,565 A | 6/1987 | Ogaki et al. | |
| 4,678,895 A | 7/1987 | Tateisi et al. | |
| 4,706,275 A | 11/1987 | Kamil | |
| 4,722,054 A | 1/1988 | Yorozu et al. | |
| 4,727,243 A | 2/1988 | Savar | |
| 4,750,201 A | 6/1988 | Hodgson et al. | |
| 4,797,540 A | 1/1989 | Kimizu | |

(Continued)

FOREIGN PATENT DOCUMENTS

EP   0397512   11/1990

(Continued)

OTHER PUBLICATIONS

Financial Advice Investment Money Oct. 1, 2009 at 5:50 pm HSBC Offshore Internet Banking.*

(Continued)

*Primary Examiner* — William Rankins
(74) *Attorney, Agent, or Firm* — Bracewell & Giuliani LLP

(57) ABSTRACT

Systems, program product, and methods for securing or procuring destination currency funds for a traveler to be used for travel in a destination country commencing at a scheduled future travel date, are provided. A system can include a domestic financial institution server including foreign destination currency transaction account program product. The system provides for establishing an interest-bearing foreign destination currency transaction account having a user-selected maturity date coinciding with a preselected travel date, and near, but prior to the preselected travel date, providing to the traveler a travel debit card having access to the balance of foreign destination currency funds including both principal and accrued interest.

11 Claims, 10 Drawing Sheets

U.S. PATENT DOCUMENTS

| | | | |
|---|---|---|---|
| 4,827,113 A | 5/1989 | Rikuna | |
| 4,868,900 A | 9/1989 | McGuire | |
| 4,877,947 A | 10/1989 | Mori | |
| 4,879,744 A | 11/1989 | Tasaki et al. | |
| 4,884,212 A | 11/1989 | Stutsman | |
| 4,951,308 A | 8/1990 | Bishop et al. | |
| 4,968,873 A * | 11/1990 | Dethloff et al. | 235/380 |
| 5,012,077 A | 4/1991 | Takano | |
| 5,048,085 A | 9/1991 | Abraham et al. | |
| 5,050,207 A | 9/1991 | Hitchcock | |
| 5,068,891 A | 11/1991 | Marshall | |
| 5,101,098 A | 3/1992 | Naito | |
| 5,138,650 A | 8/1992 | Stahl et al. | |
| 5,146,067 A | 9/1992 | Sloan et al. | |
| 5,148,481 A | 9/1992 | Abraham et al. | |
| 5,155,342 A | 10/1992 | Urano | |
| 5,163,086 A | 11/1992 | Ahearn et al. | |
| 5,192,947 A | 3/1993 | Neustein | |
| 5,220,593 A | 6/1993 | Zicker et al. | |
| 5,221,838 A | 6/1993 | Gutman et al. | |
| 5,225,666 A | 7/1993 | Amarena et al. | |
| 5,264,689 A | 11/1993 | Maes et al. | |
| 5,265,155 A | 11/1993 | Castro | |
| 5,266,782 A | 11/1993 | Alanara et al. | |
| 5,272,320 A | 12/1993 | Hakamada | |
| 5,278,752 A | 1/1994 | Narita et al. | |
| 5,285,382 A | 2/1994 | Muehlberger et al. | |
| 5,327,482 A | 7/1994 | Yamamoto | |
| 5,334,821 A | 8/1994 | Campo et al. | |
| 5,340,969 A | 8/1994 | Cox | |
| 5,352,876 A | 10/1994 | Watanabe et al. | |
| 5,359,182 A | 10/1994 | Schilling | |
| 5,409,092 A | 4/1995 | Itako et al. | |
| 5,416,306 A | 5/1995 | Imahata | |
| 5,438,186 A | 8/1995 | Nair et al. | |
| 5,442,567 A | 8/1995 | Small | |
| 5,448,044 A | 9/1995 | Price et al. | |
| 5,477,038 A | 12/1995 | Levine et al. | |
| 5,504,808 A | 4/1996 | Hamrick, Jr. | |
| 5,511,114 A | 4/1996 | Stimson et al. | |
| 5,513,117 A | 4/1996 | Small | |
| 5,550,358 A | 8/1996 | Tait et al. | |
| 5,577,109 A | 11/1996 | Stimson et al. | |
| 5,577,112 A | 11/1996 | Cambray et al. | |
| 5,661,254 A | 8/1997 | Steuer et al. | |
| 5,696,908 A | 12/1997 | Muehlberger et al. | |
| 5,699,528 A | 12/1997 | Hogan | |
| 5,732,136 A | 3/1998 | Murphree et al. | |
| 5,814,798 A | 9/1998 | Zancho | |
| 5,841,365 A | 11/1998 | Rimkus | |
| 5,859,419 A | 1/1999 | Wynn | |
| 5,875,437 A | 2/1999 | Atkins | |
| 5,878,141 A | 3/1999 | Daly et al. | |
| 5,893,907 A | 4/1999 | Ukuda | |
| 5,897,620 A | 4/1999 | Walker et al. | |
| 5,920,848 A | 7/1999 | Schutzer et al. | |
| 5,923,016 A | 7/1999 | Fredregill et al. | |
| 5,933,812 A | 8/1999 | Meyer et al. | |
| 5,963,921 A | 10/1999 | Longfield | |
| 6,000,608 A | 12/1999 | Dorf | |
| 6,012,635 A | 1/2000 | Shimada et al. | |
| 6,021,397 A | 2/2000 | Jones et al. | |
| 6,032,859 A | 3/2000 | Muehlberger et al. | |
| 6,041,308 A | 3/2000 | Walker et al. | |
| 6,065,679 A | 5/2000 | Levie et al. | |
| 6,112,191 A | 8/2000 | Burke | |
| 6,144,948 A * | 11/2000 | Walker et al. | 705/38 |
| 6,154,738 A | 11/2000 | Call | |
| 6,189,787 B1 | 2/2001 | Dorf | |
| 6,208,978 B1 | 3/2001 | Walker et al. | |
| 6,249,773 B1 | 6/2001 | Allard et al. | |
| 6,253,998 B1 | 7/2001 | Ziarno | |
| 6,304,860 B1 | 10/2001 | Martin, Jr. et al. | |
| 6,467,684 B2 | 10/2002 | Fite et al. | |
| 6,704,714 B1 | 3/2004 | O'Leary et al. | |
| 6,739,506 B1 | 5/2004 | Constantine | |
| 6,865,544 B1 | 3/2005 | Austin | |
| 6,999,943 B1 | 2/2006 | Johnson et al. | |
| 7,010,507 B1 | 3/2006 | Anderson et al. | |
| 7,031,939 B1 | 4/2006 | Gallagher et al. | |
| 7,072,862 B1 | 7/2006 | Wilson | |
| 7,127,452 B1 | 10/2006 | Yashiro | |
| 7,177,829 B1 | 2/2007 | Wilson et al. | |
| 7,206,761 B2 | 4/2007 | Colvin | |
| 7,252,223 B2 | 8/2007 | Schofield | |
| 7,258,273 B2 | 8/2007 | Griffin | |
| 7,398,919 B2 | 7/2008 | Cooper | |
| 7,426,492 B1 | 9/2008 | Bishop et al. | |
| 7,451,920 B1 | 11/2008 | Rose | |
| 7,509,286 B1 | 3/2009 | Bent et al. | |
| 7,546,945 B1 | 6/2009 | Bucci et al. | |
| 7,567,936 B1 | 7/2009 | Peckover et al. | |
| 7,606,918 B2 | 10/2009 | Holzman et al. | |
| 7,607,570 B1 | 10/2009 | Constantine | |
| 7,628,319 B2 | 12/2009 | Brown | |
| 7,653,591 B1 | 1/2010 | Dabney | |
| 7,702,583 B1 | 4/2010 | Hamilton et al. | |
| 7,702,587 B2 | 4/2010 | Nguyen et al. | |
| 7,757,944 B2 | 7/2010 | Cline et al. | |
| 7,783,571 B2 * | 8/2010 | Fish et al. | 705/43 |
| 7,792,717 B1 | 9/2010 | Hankins et al. | |
| 7,810,735 B2 | 10/2010 | Madani | |
| 7,813,955 B2 | 10/2010 | Ariff et al. | |
| 7,814,012 B2 | 10/2010 | Johnson | |
| 7,865,434 B2 | 1/2011 | Sheets | |
| 7,899,750 B1 | 3/2011 | Klieman et al. | |
| 7,904,333 B1 | 3/2011 | Perkowski | |
| 7,933,833 B2 | 4/2011 | Hotz et al. | |
| 7,954,704 B1 | 6/2011 | Gephart et al. | |
| 8,046,256 B2 | 10/2011 | Chien et al. | |
| 8,051,006 B1 | 11/2011 | Rourk | |
| 2001/0021925 A1 | 9/2001 | Ukigawa et al. | |
| 2001/0034676 A1 | 10/2001 | Vasic | |
| 2001/0042785 A1 | 11/2001 | Walker et al. | |
| 2002/0002075 A1 | 1/2002 | Rowe | |
| 2002/0032612 A1 | 3/2002 | Williams et al. | |
| 2002/0077971 A1 * | 6/2002 | Allred | 705/39 |
| 2002/0152161 A1 | 10/2002 | Aoike | |
| 2002/0194122 A1 | 12/2002 | Knox et al. | |
| 2002/0194124 A1 | 12/2002 | Hobbs et al. | |
| 2003/0004997 A1 | 1/2003 | Parker et al. | |
| 2003/0055782 A1 | 3/2003 | Slater | |
| 2003/0061170 A1 | 3/2003 | Uzo | |
| 2003/0074311 A1 | 4/2003 | Saylors et al. | |
| 2003/0097331 A1 | 5/2003 | Cohen | |
| 2003/0135459 A1 | 7/2003 | Abelman et al. | |
| 2003/0144935 A1 | 7/2003 | Sobek | |
| 2003/0158811 A1 | 8/2003 | Sanders et al. | |
| 2003/0167225 A1 | 9/2003 | Adams | |
| 2003/0191702 A1 | 10/2003 | Hurley | |
| 2003/0191714 A1 | 10/2003 | Norris | |
| 2003/0197059 A1 | 10/2003 | Tidball et al. | |
| 2003/0200118 A1 | 10/2003 | Lee et al. | |
| 2003/0208443 A1 | 11/2003 | Mersky | |
| 2003/0217003 A1 | 11/2003 | Weinflash et al. | |
| 2004/0036215 A1 | 2/2004 | Butler | |
| 2004/0047459 A1 | 3/2004 | Diaz | |
| 2004/0098351 A1 | 5/2004 | Duke | |
| 2004/0111370 A1 | 6/2004 | Saylors et al. | |
| 2004/0117250 A1 | 6/2004 | Lubow et al. | |
| 2004/0117302 A1 | 6/2004 | Weichert et al. | |
| 2004/0133515 A1 | 7/2004 | McCoy et al. | |
| 2004/0143527 A1 * | 7/2004 | Benkert et al. | 705/35 |
| 2004/0148252 A1 | 7/2004 | Fleishman | |
| 2004/0153407 A1 | 8/2004 | Clubb et al. | |
| 2004/0199463 A1 | 10/2004 | Deggendorf | |
| 2004/0210484 A1 | 10/2004 | Lee | |
| 2004/0211830 A1 | 10/2004 | Algiene | |
| 2004/0215554 A1 | 10/2004 | Kemper et al. | |
| 2004/0225545 A1 | 11/2004 | Turner et al. | |
| 2004/0230523 A1 | 11/2004 | Johnson | |
| 2004/0235542 A1 | 11/2004 | Stronach et al. | |
| 2004/0236646 A1 * | 11/2004 | Wu et al. | 705/30 |
| 2005/0004839 A1 | 1/2005 | Bakker et al. | |
| 2005/0015332 A1 | 1/2005 | Chen | |
| 2005/0021363 A1 | 1/2005 | Stimson et al. | |
| 2005/0075939 A1 | 4/2005 | Bao et al. | |

| | | |
|---|---|---|
| 2005/0082364 A1 | 4/2005 | Alvarez et al. |
| 2005/0108121 A1 | 5/2005 | Gravett et al. |
| 2005/0167481 A1 | 8/2005 | Hansen et al. |
| 2005/0167487 A1 | 8/2005 | Conlon et al. |
| 2005/0173520 A1 | 8/2005 | Jaros et al. |
| 2005/0177489 A1 | 8/2005 | Neff et al. |
| 2005/0203837 A1 | 9/2005 | Leigh et al. |
| 2005/0205663 A1 | 9/2005 | Algiene |
| 2005/0228724 A1 | 10/2005 | Frangiosa |
| 2005/0278188 A1 | 12/2005 | Thomson et al. |
| 2005/0278347 A1 | 12/2005 | Wolf et al. |
| 2005/0283436 A1 | 12/2005 | Greer et al. |
| 2006/0059085 A1 | 3/2006 | Tucker |
| 2006/0085269 A1 | 4/2006 | Guilfoyle |
| 2006/0085334 A1 | 4/2006 | Murphy |
| 2006/0149665 A1 | 7/2006 | Weksler |
| 2006/0149670 A1 | 7/2006 | Nguyen |
| 2006/0161499 A1 | 7/2006 | Rich et al. |
| 2006/0190322 A1 | 8/2006 | Oehlerking et al. |
| 2006/0206402 A1 | 9/2006 | Sullivan |
| 2006/0212392 A1 | 9/2006 | Brown |
| 2006/0212393 A1 | 9/2006 | Brown |
| 2006/0224502 A1 | 10/2006 | McGowan |
| 2006/0249570 A1 | 11/2006 | Seifert |
| 2006/0259957 A1 | 11/2006 | Tam et al. |
| 2006/0282356 A1 | 12/2006 | Andres et al. |
| 2006/0282374 A1 | 12/2006 | Stone |
| 2006/0293966 A1 | 12/2006 | Inouye |
| 2007/0000997 A1 | 1/2007 | Lambert et al. |
| 2007/0011089 A1 | 1/2007 | DeSchryver |
| 2007/0038515 A1 | 2/2007 | Postrel |
| 2007/0038924 A1 | 2/2007 | Beyer et al. |
| 2007/0045401 A1 | 3/2007 | Sturm |
| 2007/0061206 A1 | 3/2007 | LeFebvre |
| 2007/0083462 A1 | 4/2007 | Cubillo et al. |
| 2007/0087819 A1 | 4/2007 | VanLuchene et al. |
| 2007/0090183 A1 | 4/2007 | Hursta et al. |
| 2007/0100745 A1 | 5/2007 | Keiser et al. |
| 2007/0106603 A1 | 5/2007 | Whyte et al. |
| 2007/0136194 A1 | 6/2007 | Sloan |
| 2007/0152038 A1 | 7/2007 | Ciancio et al. |
| 2007/0168265 A1 | 7/2007 | Rosenberger |
| 2007/0174189 A1 | 7/2007 | Bishop et al. |
| 2007/0175984 A1 | 8/2007 | Khandaker et al. |
| 2007/0198352 A1 | 8/2007 | Kannegiesser |
| 2007/0198354 A1 | 8/2007 | Senghore et al. |
| 2007/0198403 A1 | 8/2007 | Aloni et al. |
| 2007/0233596 A1 | 10/2007 | Ambrose |
| 2007/0244778 A1 | 10/2007 | Bailard |
| 2007/0250380 A1 | 10/2007 | Mankoff |
| 2007/0260536 A1 | 11/2007 | Stone |
| 2007/0262140 A1 | 11/2007 | Long, Sr. |
| 2007/0265957 A1 | 11/2007 | Advani et al. |
| 2007/0265960 A1 | 11/2007 | Advani et al. |
| 2007/0267479 A1 | 11/2007 | Nix et al. |
| 2007/0271178 A1 | 11/2007 | Davis et al. |
| 2007/0276736 A1 | 11/2007 | Guilfoyle |
| 2007/0282740 A1 | 12/2007 | Wendt |
| 2008/0005001 A1 | 1/2008 | Davis et al. |
| 2008/0021772 A1 | 1/2008 | Aloni et al. |
| 2008/0040261 A1 | 2/2008 | Nix et al. |
| 2008/0040265 A1 | 2/2008 | Rackley et al. |
| 2008/0052189 A1 | 2/2008 | Walker |
| 2008/0059363 A1 | 3/2008 | Hotz et al. |
| 2008/0065532 A1 | 3/2008 | De la Motte |
| 2008/0091519 A1 | 4/2008 | Foss |
| 2008/0103970 A1 | 5/2008 | Books et al. |
| 2008/0120129 A1* | 5/2008 | Seubert et al. ............ 705/1 |
| 2008/0140561 A1 | 6/2008 | Neel |
| 2008/0140568 A1 | 6/2008 | Henry |
| 2008/0162271 A1 | 7/2008 | Benjamin |
| 2008/0210753 A1 | 9/2008 | Plozay et al. |
| 2008/0228643 A1 | 9/2008 | Hall |
| 2008/0235095 A1 | 9/2008 | Oles et al. |
| 2008/0270298 A1 | 10/2008 | McElroy et al. |
| 2008/0281734 A1 | 11/2008 | Longe et al. |
| 2008/0294977 A1 | 11/2008 | Friedman et al. |
| 2008/0301162 A1 | 12/2008 | Wall et al. |
| 2009/0048963 A1 | 2/2009 | Bishop et al. |
| 2009/0063297 A1 | 3/2009 | Dooley et al. |
| 2009/0063342 A1 | 3/2009 | Beckers |
| 2009/0063351 A1 | 3/2009 | Schmeyer et al. |
| 2009/0157220 A1 | 6/2009 | Walker |
| 2009/0164362 A1 | 6/2009 | Moore |
| 2009/0164363 A1 | 6/2009 | Ahlers |
| 2009/0171775 A1 | 7/2009 | Cashion, Jr. et al. |
| 2009/0192934 A1 | 7/2009 | Chu et al. |
| 2009/0222367 A1 | 9/2009 | Jenkins et al. |
| 2009/0228307 A1 | 9/2009 | Sorbe |
| 2009/0254431 A1 | 10/2009 | Crowe et al. |
| 2010/0030687 A1 | 2/2010 | Panthaki et al. |
| 2010/0057554 A1 | 3/2010 | Lanford |
| 2010/0057609 A1 | 3/2010 | Sibson |
| 2010/0076875 A1 | 3/2010 | Ernst et al. |
| 2010/0106555 A1 | 4/2010 | Mneimneh |
| 2010/0222132 A1 | 9/2010 | Sanford et al. |
| 2010/0280949 A1* | 11/2010 | Van Rensburg ............ 705/44 |
| 2010/0306104 A1 | 12/2010 | Johnson |
| 2010/0312684 A1 | 12/2010 | Kemper et al. |
| 2011/0047039 A1 | 2/2011 | Crames et al. |
| 2011/0106698 A1 | 5/2011 | Isaacson et al. |
| 2011/0270664 A1 | 11/2011 | Jones |

FOREIGN PATENT DOCUMENTS

| | | |
|---|---|---|
| EP | 0619565 | 10/1994 |
| EP | 0348932 | 5/1995 |
| JP | 2-238593 | 9/1990 |
| JP | 2-278495 | 11/1990 |
| JP | 3-100791 | 4/1991 |
| JP | 4-165588 | 6/1992 |
| KR | 2010010217 | 2/2010 |
| KR | 2010010217 A * | 2/2010 |
| WO | 86/02757 | 5/1986 |
| WO | 86/07647 | 12/1986 |
| WO | 88/03297 | 5/1988 |
| WO | 89/08899 | 9/1989 |
| WO | 91/09370 | 6/1991 |
| WO | 93/09515 | 5/1993 |
| WO | 94/10649 | 5/1994 |
| WO | 94/28498 | 12/1994 |
| WO | 95/03570 | 2/1995 |
| WO | 97/46986 | 12/1997 |
| WO | 00/60487 | 10/2000 |
| WO | 2007/133315 | 11/2007 |
| WO | 2008102329 | 8/2008 |
| ZA | 200709282 | * 10/2007 |

OTHER PUBLICATIONS

Financial Advice Investment Money Oct. 1, 2009 at 7:25 am HSBC Offshore Banking.*

Nieman Marcus: High-Tech for the Holidays, ADWEEK, Dec. 5, 1994 (1 page).

Neiman Marcus Offers Electronic Gift Certificate, Card Fax, Jan. 23, 1995 (1 page).

Neiman Marcus to Launch NM Express Automated Gift Card, PR Newswire, Nov. 22, 1994 (1 page).

NM Express Card Advertisement, The New Yorker, Dec. 12, 1994 (3 pages).

Service Mark Registration No. 1,981,044 for "NM Express Card", registered Jun. 18, 1996 (1 page).

Omni 480/490 Programmer's Guide, VeriFone Part No. 12924—Revision A, Manual Revision 1.0, Oct. 1993 (228 pages).

"One Company's Diversification Shakes Up Peripherals Market", Chain Store Age, Jun. 1996 (3 pages).

O'Keefe, Michael, "Portable POS Terminal Mean Greater Convenience", Bank Systems & Technology, Nov. 1994 (2 pages).

"POS Terminal Can Handle Direct Debits", ABA Banking Journal, Sep. 1984 (2 pages).

Racel Corp. Advertisement, POS Terminal Eliminates Credit Card Vouchers, ABA Banking Journal, Nov. 1985 (2 pages).

Szabo, Joan C., "The Changing World of Financial Services", Nation's Business, Oct. 1994 (7 pages).

VeriFone Everest Advertisement, Stores, May 1995 (2 pages).

VeriFone Folio (TM) Brings Credit and Debit Card Payment to the Restaurant Table, PR Newswire, May 16, 1994 (3 pages).

Barnes, David B., VeriFone Introduces Everest (TM) Customer Activated Payment System to Multi-Lane Retail Market, OR Newswire, Feb. 20, 1995 (2 pages).
VeriFone Introduces Pinpad (TM) 1000 to Point-of-Sale Debit Market, M2 Presswire, Apr. 21, 1995 (1 page).
VeriFone TCL Terminal Control Language Programmer's Manual, VeriFone Part No. 00368-01, Revision G, Manual Revision 8.0, Aug. 1992 (362 pages).
VeriFone Tranz 330 Reference Manual, VeriFone Part No. 00483—Revision D, Manual Revision 3.01, Apr. 1990 (144 pages).
MICROTRAX, Ltd. Omni 490 M (and 490ML) Operation Manual for Integrated and Non-Integrated Configurations, 1994 (60 pages).
MICROTRAX Electronic Payment Systems: The MicroTrax Pinstripe Lane Equipment Users Guide, MicroTrax Ltd., Newport Beach, CA 1991 (54 pages).
IBM 4680-4690 Supermarket Application—Electronic Funds Transfer Feature Enhancement: User's Guide, IBM Corp., Research Triangle Park, NC, Sep. 1995 (318 pages).
IBM 4680 General Sales Application Electronic Funds Transfer User's Guide, IBM Corp., Research Triangle Park, NC, Dec. 1990 (260 pages).
IBM 4680 General Sales Application Electronic Funds Transfer User's Guide, IBM Corp., Research Triangle Park, NC, Mar. 1991 (263 pages).
IBM 4680 General Sales Application: Guide to Operations, Research Triangle Park,NC, Jun. 1991 (422 pages).
Krino, Gary, et al., "A Birthday Card That Pays Off", The Orange County Register, Jul. 19, 1996 (2 pages).
Cohen, Bruce, "Alternative to Cash Gains Ground", The Financial Post, Apr. 22, 1994 (2 pages).
Bank of Boulder POS Debit Solution at the Table Now in Beta: First Bank to Certify IVI Spirit C2000 on MAPP (R), Business Wire, Aug. 3, 1994 (1 page).
Co-pending U.S. Appl. No. 12/562,331, filed Sep. 18, 2009, titled "Computerized Extension of Credit to Existing Demand Deposit Accounts, Prepaid Cards and Lines of Credit Based on Expected Tax Refund Proceeds, Associated Systems and Computer Program Products".
Co-pending U.S. Appl. No. 12/700,681, filed Feb. 4, 2010, titled System and Computer Program Product to Issue a Retail Prepaid Card including a User-Designed External Face Using a Chit and Related Computer Implemented Methods.
Co-pending U.S. Appl. No. 12/814,405, filed Jun. 11, 2010, titled Environmental-Friendly Fuel Credit Card System, Program Product, and Computer-Implemented Methods.
Co-pending U.S. Appl. No. 12/877,490, filed Sep. 8, 2010, titled "System, Program Product, and Method for Debit Card and Checking Account Autodraw".
Co-pending U.S. Appl. No. 12/877,524, filed Sep. 8, 2010, titled System, Program Product, and Method for Debit Card and Checking Account Autodraw.
Co-pending U.S. Appl. No. 12/889,281, filed Sep. 23, 2010, titled "Computer-Implemented Methods, Computer Program Products, and Systems for Enhanced Loan Product Repayments".
Co-pending U.S. Appl. No. 12/892,847, filed Sep. 28, 2010, titled "Computer-Implemented Methods, Computer Program Products, and Systems for Management and Control of a Loyalty Rewards Network".
Co-pending U.S. Appl. No. 12/731,852, filed Mar. 25, 2010, titled "Machine, Program Product, and Computer Implemented Methods for Confirming a Mobile Banking Request".
Co-pending U.S. Appl. No. 13/036,076, filed Feb. 28, 2011, titled "Machine, Program Product, and Computer-Implemented Method to Construct a Person-To-Person Loan".
Co-pending U.S. Appl. No. 12/417,199, filed Apr. 2, 2009, titled "System, Program Product, and Associated Methods to Autodraw for Micro-Credit Attached to a Prepaid Card".
Co-pending U.S. Appl. No. 12/389,749, filed Feb. 20, 2009, titled "Methods to Advance Loan Proceeds on Prepaid Cards, Associated Systems and Computer Program Products".
Co-pending U.S. Appl. No. 12/397,113, filed Mar. 3, 2009, titled "Person-To-Person Lending Program Product, System, and Associated Computer-Implemented Methods".

Co-pending U.S. Appl. No. 12/338,365, filed Dec. 18, 2008, titled"Transfer Account Systems, Computer Program Products, and Associated Computer-Implemented Methods".
"Letter of Credit Explained: What is Letter of Credit?", Dec. 26, 2005, pp. 1-2.
VIPGift Received Investment from Summit Partners and Bridgescale Partners, Nov. 11, 2008, Chattanooga, TN and Palo Alto, CA.
Bank Deals—Best Rates and Deals: EverBank's World Currency CDs—My Interview with EverBank's Executive Frank Trotter, http://bankdeals.blogspot.com, Jul. 29, 2007.
Foreign Exchange Market, http://en.wikipedia.org.
Avoid Gift Card Pitfalls, ConsumerReports.org.
Zubko, N., "An Automatic Connection Electronic Transaction Tools Help Manufacturers Connect With Suppliers to Streamline Sourcing Efforts", Industry Week, Jul. 2008, pp. 26-27, vol. 257, No. 7.
Lazarus, David, "120% rate for Wells' Advances", Oct. 16, 2004, San Francisco Chronicle (cited in Final Office Action in co-pending U.S. Appl. No. 12/338,684 dated Sep. 23, 2011).
Congressional Budget Office, "Emerging Electronic Methods for Making Payments" (Jun. 1996), CBO.
Coady et al., "Targeted anti-poverty intervention: A selected annotated bibliography" (Apr. 2002), World Bank.
Business Dateline, Q Comm Expands Calling Card Products with Best Telecom Point-of-Sale Activated Cards; All Q Comm Verifone Merchants Can Now Deliver Durable Calling Cards (Dec. 6, 2010), Business Wire (Dec. 8, 2011).
MasterCard Electronic Prepaid (Oct. 2003), The Nilson Report (798), (Dec. 20, 2011), The Banking Source (Document ID 474833171).
Office action from co-pending U.S. Appl. No. 12/338,497 dated Aug. 18, 2011.
Notice of Allowance for co-pending U.S. Appl. No. 12/417,199 dated Aug. 18, 2011.
Notice of Allowance for co-pending U.S. Appl. No. 12/417,211 dated Aug. 22, 2011.
Notice of Allowance for co-pending U.S. Appl. No. 12/554,659 dated Aug. 2, 2011.
Office Action in co-pending U.S. Appl. No. 12/338,712 dated Jul. 28, 2011.
Office Action in co-pending U.S. Appl. No. 12/338,440 dated Aug. 1, 2011.
Office Action in co-pending U.S. Appl. No. 12/367,187 dated Jun. 27, 2011.
Office Action in co-pending U.S. Appl. No. 12/609,896 dated Apr. 5, 2011.
Office Action in co-pending U.S. Appl. No. 12/417,162 dated Apr. 13, 2011.
Office Action in co-pending U.S. Appl. No. 12/338,684 dated Mar. 4, 2011.
Office Action in co-pending U.S. Appl. No. 12/417,199 dated Mar. 17, 2011.
Office Action in co-pending U.S. Appl. No. 12/465,803 dated Mar. 17, 2011.
Office Action in co-pending U.S. Appl. No. 12/338,584 dated Mar. 22, 2011.
Office Action in co-pending U.S. Appl. No. 12/417,211 dated Mar. 29, 2011.
Office Action in co-pending U.S. Appl. No. 12/407,320 dated Mar. 29, 2011.
Office Action in co-pending U.S. Appl. No. 12/338,402 dated Feb. 18, 2011.
Office Action in co-pending U.S. Appl. No. 12/338,402 dated Sep. 28, 2010.
Office Action in co-pending U.S. Appl. No. 12/417,162 dated Sep. 3, 2010.
International Search Report for PCT/US09/56072 dated Oct. 20, 2009.
International Search Report for PCT/US09/39504 dated May 27, 2009.
International Search Report for PCT/US09/39512 dated Jun. 8, 2009.
International Search Report for PCT/US09/43978 dated Jun. 30, 2009.

International Search Report for PCT/US09/43988 dated Jul. 14, 2009.
International Search Report for PCT/US09/39492 dated May 14, 2009.
International Search Report for PCT/US09/39495 dated May 18, 2009.
International Search Report for PCT/US08/87689 dated Jun. 17, 2009.
Office Action in co-pending U.S. Appl. No. 12/338,645 dated Jul. 9, 2010.
Office Action in co-pending U.S. Appl. No. 12/338,365 dated Jul. 9, 2010.
Final Office Action in co-pending U.S. Appl. No. 12/338,645 dated Jan. 26, 2011.
Office Action in co-pending U.S. Appl. No. 12/338,365 dated Jan. 26, 2011.
Office Action in co-pending U.S. Appl. No. 12/417,162 dated Jan. 19, 2011.
Office Action in co-pending U.S. Appl. No. 12/389,749 dated Feb. 1, 2011.
Office Action in co-pending U.S. Appl. No. 12/338,540 dated Sep. 1, 2011.
International Search Report for PCT/US09/34692 dated Apr. 14, 2009.
Notice of Allowance from co-pending U.S. Appl. No. 12/609,896 dated Oct. 27, 2011.
Office Action from co-pending U.S. Appl. No. 12/465,277 dated Oct. 20, 2011.
Office Action from co-pending U.S. Appl. No. 12/562,331 dated Oct. 20, 2011.
Notice of Allowance from co-pending U.S. Appl. No. 12/407,320 dated Oct. 18, 2011.
Final Office Action in co-pending U.S. Appl. No. 12/338,584 dated Sep. 15, 2011.
Final Office Action in co-pending U.S. Appl. No. 12/338,684 dated Sep. 23, 2011.
Office Action in co-pending U.S. Appl. No. 12/397,113 dated Sep. 30, 2011.
Notice of Allowance in co-pending U.S. Appl. No. 12/338,645 dated Oct. 3, 2011.
Office Action in co-pending U.S. Appl. No. 12/417,182 dated Sep. 28, 2011.
Office Action in co-pending U.S. Appl. No. 12/465,306 dated Nov. 10, 2011.
Office Action in co-pending U.S. Appl. No. 12/626,349 dated Nov. 22, 2011.
Final Office Action in co-pending U.S. Appl. No. 12/338,440 dated Jan. 19, 2012.
Downes, "How to avoid exchange charges, Wasting Money, A foreign currency bank account could be the answer", The Daily Telegraph, London (UK), Mar. 10, 2007, p. 12.
Office Action in co-pending U.S. Appl. No. 12/607,780 dated Mar. 19, 2012.
Notice of Allowance in co-pending U.S. Appl. No. 12/562,331 dated Mar. 20, 2012.
Notice of Allowance in co-pending U.S. Appl. No. 12/465,803 dated Mar. 20, 2012.
Final Office Action in co-pending U.S. Appl. No. 12/389,749 dated Mar. 29, 2012.
Final Office Action in co-pending U.S. Appl. No. 12/731,852 dated Apr. 5, 2012.
Final Office Action in co-pending U.S. Appl. No. 12/465,306 dated Apr. 11, 2012.
Notice of Allowance in co-pending U.S. Appl. No. 13/349,423 dated Apr. 13, 2012.
Office Action in co-pending U.S. Appl. No. 12/877,490 dated Apr. 18, 2012.
Office Action in co-pending U.S. Appl. No. 12/892,847, dated Apr. 30. 2012.
Office Action in co-pending U.S. Appl. No. 12/338,540, dated Mar. 15, 2012.
Notice of Allowance from co-pending U.S. Appl. No. 12/609,896, dated Jan. 3, 2012.
Notice of Allowance from co-pending U.S. Appl. No. 13/233,268, dated Dec. 13, 2011.
Office Action from co-pending U.S. Appl. No. 12/367,187, dated Jan. 6, 2012.
Office Action from co-pending U.S. Appl. No. 12/731,852, dated Dec. 22, 2011.
Notice of Allowance from co-pending U.S. Appl. No. 12/465,803, dated Dec. 20, 2011.
Office Action for co-pending U.S. Appl. No. 13/232,405, dated Feb. 2, 2012.
Final Office Action for co-pending U.S. Appl. No. 12/465,277, dated Feb. 28, 2012.
Notice of Allowance for co-pending U.S. Appl. No. 12/417,182, dated Feb. 14, 2012.
Final Office Action for co-pending U.S. Appl. No. 12/338,497, dated Mar. 1, 2012.
Office Action for co-pending U.S. Appl. No. 12/877,524, dated Feb. 14, 2012.
Office Action for co-pending U.S. Appl. No. 12/700,681, dated Mar. 23, 2012.
Jane Boon Pearlstine, "Lenders, Borrowers Hook Up Over the Web: Prosper.com and Other Sites Provide Forum for Individual Bidders Willing to Offer Small Loans", Wall Street Journal, May 20, 2006.
United Nations Conference on Trade and Development, "E-Finance and Small and Medium-Size Enterprises (SMEs) in Developing and Transition Economies", UNCTAD Expert Meeting, Oct. 17, 2001.
Tim Jones, "Paradigms Lost", RSA Journal, Oct. 2006,pp. 28-31.
Diego Rumiany, "Internet Bidding for Microcredit: Making it Work in the Developed World, Conceiving it for the Developing World", Mar. 2007.
Stefan Heng, Thomas Meyer,and Antje Stobbe, "Implications of Web 2.0 for Financial Institutions: Be a Driver, Not a Passenger", Munich Personal RePEc Archive, Jul. 31, 2007.
Matt Flannery, "Kiva and the Birth of Person to Person Microfinance", Innovations, pp. 31-58, Winter & Spring 2007.
Michael K. Hulme and Collette Wright, "Internet Based Social Lending: Past, Present and Future", Social Futures Observatory, Oct. 2006.
Richard W. Coleman, "Is the Future of the Microfinance Movement to be Found on the Internet?", International Trade and Finance Association Working Papers, 2007.
Amanda Scott and Patrick Towell, "The Web We Weave", Financial World, pp. 12-15, Nov. 2006.
Prosper, "Access and Transparency through Person-to-Person Lending," FDIC Advisory Committee on Economic Inclusion, Mar. 28, 2007.
Co-pending U.S. Appl. No. 12/338,402, filed Dec. 18, 2008, titled "Transfer Account Systems, Computer Program Products, and Associated Computer-Implemented Methods".
Co-pending U.S. Appl. No. 12/338,440, filed Dec. 18, 2008, titled "Transfer Account Systems, Computer Program Products, and Associated Computer-Implemented Methods".
Co-pending U.S. Appl. No. 12/338,712, filed Dec. 18, 2008, titled "Computer-Implemented Methods, Program Product, and System to Enhance Banking Terms Over Time".
Co-pending U.S. Appl. No. 12/338,684, filed Dec. 18, 2008, titled "Transfer Account Systems, Computer Program Products, and Associated Methods".
Co-pending U.S. Appl. No. 12/338,497, filed Dec. 18, 2008, titled "Private Label Promotion Card System, Program Product, and Associated Computer-Implemented Methods".
Co-pending U.S. Appl. No. 12/338,540, filed Dec. 18, 2008, titled "Private Label Promotion Card System, Program Product, and Associated Computer-Implemented Methods".
Co-pending U.S. Appl. No. 12/338,584, filed Dec. 18, 2008, titled "Transfer Account Systems, Computer Program Products,and Methods to Prioritize Payments From Preselected Bank Accounts".
Co-pending U.S. Appl. No. 12/338,645, filed Dec. 18, 2008, titled "Transfer Account Systems, Computer Program Products, and Methods to Prioritize Payments From Preselected Bank Accounts".
Co-pending U.S. Appl. No. 12/554,659, filed Sep. 4, 2009, titled "System,Method, and Program Product for Foreign Currency Travel Account".

Co-pending U.S. Appl. No. 12/554,432, filed Sep. 4, 2009, titled "System, Program Product and Methods for Retail Activation and Reload Associated With Partial Authorization Transactions".

Cross, Sam Y., All About . . . the Foreign Exchange Market in the United States, 1998, Federal Reserve Bank of new York.

Wolfe, Daniel, "An E-Variation on Payday Loan Theme", American Banker, Jul. 28, 2005 (Cited in Notice of Allowance).

Financial Advice Investment Money Oct. 1, 2009 at 5:50pm, HSBC Offshore Internet Banking (Cited in Notice of Allowance in co-pending U.S. Appl. No. 12/554,659).

Financial Advice Investment Money Oct. 1, 2009 at 7:25 am, HSBC Offshore Internet Banking (Cited in Notice of Allowance in co-pending U.S. Appl. No. 12/554,659).

Orszag, Peter, "Unemployment Insurance as an Economic Stimulus", Center for Budget and Policy Priorities, Nov. 15, 2011.

Powell, Robert L., "Statewide Electronic Commerce Program Status Report", State of North Carolina Office of the State Controller, Mar. 7, 2007.

Parrott, James, "Jittery Wall Street, Calm City?", Gotham Gazette, Apr. 16, 2007.

Zandi, Mark, "Washington Throws the Economy a Rope", Moody's Economy.com, Jan. 22, 2008.

Blair, Christine E., et al., "Challenges to the Dual Banking System: The Funding of Bank Supervision", FDIC Bank Review, Mar. 31, 2006.

"Developing Asia and the World", Asian Development Bank 2002.

MICROTRAX Ltd., PC Electronic Payment Systems Reference Manual; 1995 (381 pages).

Caskey, John P. et al., "Is the Debit Card Revolution Finally Here", Federal Reserve Bank of Kansas City, Economic Review: Fourth Quarter 1994; pp. 70-95, vol. 79, #4 (17 pages).

Castaneda, Laura, "Business Promote Services to Customers Day In and Day Out", The Dallas Morning News, Nov. 26, 1994 (3 pages).

Mannix, Margaret, "Checkout Tech", U.S. News and World Report, Feb. 27, 1995, (6 pages).

"Credit Terminals to be Used at Canadian Liquor Outlets", Card News, Jan. 23, 1995, (1 page).

"Debit Card Popularity on the Rise," Chain Store Age Executive, Jan. 1994, (1 page).

"Debit Goes to Dinner", Credit Card Management, New York, Oct. 1994 (2 pages).

Peppard, Alan, "Down and Dirty in Deep Ellum," The Dallas Morning News, Dec. 3, 1994 (2 pages).

Everest Reference Manual, VeriFone Part No. 25399, Revision A, Manual Revision 1.0, Jul. 1995, (66 pages).

"Express Cards and Trains", Chain Store Age Executive Edition, Jan. 1995, (1 page).

Brown, Suzanne, "Goodnight Amy, Meg, Beth and Jo", Rocky Mountain News, Dec. 8, 1994 (1 page).

Klein, Robert J., "Here Comes the Debit Card", D& B Reports, Jul./Aug. 1990 (2 pages).

Hypercom S7C Advertisement, Chain Store Age, Sep. 1995 (4 pages).

Hypersom S7SC Advertisement, Chain Store Age, Feb. 1996 (2 pages).

IBM 4680-4690 Advanced Payment System for Chain Drug Sales Application User's Guide, Nov. 1996 (256 pages).

IBM 4680-4690 Advanced Payment System for Chain Drug Sales Application User's Guide, Jul. 1996 (248 pages).

IBM 4680-4690 Advanced Payment Systems for Supermarket Application User's Guide, Sep. 1996 (222 pages).

Fox, Linda A., "Keep an Eye on Your Credit Card," The Toronto Sun, Aug. 9, 1996 (1 page).

Pyatt, Rudolph A., Jr., "Mobil Stations to Permit Use of Bank Cards", The Washington Post (1 page).

NCR 4430-5000 MSR/PIN User's Guide, 1994 (265 pages).

* cited by examiner

FIG. 9.

- 301
- 305 NAME
- 307 ADDRESS 1
- 308 ADDRESS 2
- 309 TRAVEL AGENCY (AFFILIATED)
- 311 FOREIGN DESTINATION
- 303 TRAVEL DATE / SUBMIT

TRAVELER INFORMATION

FIG. 10.

- 321
- 323 EXCHANGE RATE DISPLAY
- DOMESTIC CURRENCY → FOREIGN CURRENCY
- EXCHANGE RATE QUOTE
- 325 AMOUNT OF FUNDS DESIRED
- DOMESTIC OR FOREIGN
- OK

SYSTEM, METHOD, AND PROGRAM PRODUCT FOR FOREIGN CURRENCY TRAVEL ACCOUNT

RELATED APPLICATIONS

This application is a divisional of and claims the benefit and priority of U.S. patent application Ser. No. 13/232,405, filed on Sep. 14, 2011, titled "System, Method, and Program Product For Foreign Currency Travel Account," which is a continuation of and claims the benefit and priority of U.S. patent application Ser. No. 12/554,659, filed on Sep. 4, 2009, U.S. Pat. No. 8,024,242, issued Sep. 20, 2011, titled "System, Methods, and Program Product for Foreign Currency Travel," which claims priority and the benefit of U.S. Provisional Patent Application No. 61/094,328, filed on Sep. 4, 2008, titled "System, Methods, and Program Product for Foreign Currency Travel." Each of these previous applications is incorporated herein by reference in its entirety.

BACKGROUND OF THE INVENTION

1. Field of the Invention

The present invention relates generally to the financial service and banking industries, and, more particularly, to systems and computer program products for securing foreign currency funds for travel abroad, and related methods.

2. Description of Related Art

As far back as the time of the Roman Empire and prior, people have traveled from their home village or country to distant villages or countries. One problem faced by such travelers, was the transportation of items of value, such as gold, silver, goods for barter, or currency, in order to procure sustenance, living quarters, and/or souvenirs. Carrying gold, silver, or items applicable for trade, for example, would add a weight burden and would attract thieves. Further, in countries having minted currency, usually made with the blacksmiths hammer, acceptance of such currency, if differing from the currency in the destination country, presented potential acceptance issues, particularly if the currency did not have the same face value as the base material.

The modern world presents a similar set of issues. Attraction of thieves to hard currency is still a significant issue. Further, although much more convenient to carry than in the olden days, transportation of currency, especially, for example, in a beach environment, or when one is exercising, remains a significant issue. Additionally, unlike currency in the form of precious metal based coins or pieces of gold, silver, etc., which tended to have a fairly stable value, in the modern world, currency in the destination country can have severe value fluctuations with respect to domestic currency, resulting in highly variable foreign exchange rates and large variations in purchasing power.

Numerous factors can influence the foreign exchange rates. Such factors, for example, can include economic strength of both the commencement and the destination countries, their political stability, national and transnational policies and relationships, and/or demand for the respective currency, and, of course, the size of the foreign exchange transaction. Due to such high variability and numerous factors influencing foreign exchange rates, it is extremely difficult for the would-be traveler to predict future exchange rates, even for a short period. Travel plans, however, are frequently made many months, and sometimes even years, in advance. As such, recognized by the inventor is that there can be some significant foreign exchange rate risk associated with travel arrangements planned significantly in advance, which can result in what would appear to be affordable travel arrangements becoming unaffordable at the time the travel arrangements are to be commenced due to variations in the foreign exchange rate, which are difficult, if not impossible, to predict by the would be traveler.

Further, also as a result of the destination country's political stability and the country's national policies, for example, once exchanged, the destination currency can face significant valuation fluctuations with respect to goods and services sold within the borders of the destination country. Where the price of an apple, today, can equal one unit of destination currency, the price of the same apple three months later may equal three units of the same destination currency. As such, recognized by the inventor is that there can be some significant internal valuation issues within the country by holding hard currency that may tend to prevent a traveler having advance travel arrangements from desiring to conduct a foreign exchange transaction at a time that is significantly before the time that the hard currency would be needed. Notably, such countries having a high inflation rate also typically have banks which have interest-bearing accounts that pay rates that are much higher than that of interest-bearing accounts in banks located in countries having a lower inflation rate. Thus, also recognized by the inventor is that part of the difficulties resulting from inflation of the destination currency can be offset if funds are deposited in an account which pays interest which better reflects the inflation rate of the destination currency.

As noted above, attraction of thieves to hard currency is still a significant issue. Typical methodologies used to counteract such issue can include the use of traveler's checks and/or use of credit cards. Debit cards, although not necessarily a method of choice for international travelers, are quickly becoming a methodology that is used, at least internally by local nationals of the most popular destination countries. Credit and debit cards, however, still have some value to a thief, but can be readily canceled once the traveler discovers the theft. Further, credit and debit cards have suffered some fee related issues. Additionally, for any purchases or withdrawals using a standard issue debit card, the traveler has typically been at the mercy of the local exchange rate at the time of the transaction, which, as noted above, can be very hard, especially for the traveler, to predict at the time the traveler "books" his or her travel arrangements. Additionally, debit cards (debit card networks) have suffered severe cross-border compatibly issues. Nevertheless, separately within some individual countries, use of debit cards by locals has become so wide-spread that use of debit cards, in such countries, is to the point of overtaking the use of checks and sometimes even cash, at least by volume.

Recognized by the inventor, therefore, is the need for systems, program product, and methods for securing or procuring destination currency funds for a traveler to be used for travel in a destination country commencing at a scheduled future travel date, which does not subject to the traveler to an excessive currency exchange rate risk, and which helps minimize the effects of inflation within the destination country.

SUMMARY OF THE INVENTION

In view of the foregoing, various embodiments of the present invention advantageously provide systems, program product, and methods for securing or procuring destination currency funds for a traveler to be used for travel in a destination country commencing at a scheduled future travel date. Various embodiments of the present invention also provide systems, program product, and methods which do not subject to the traveler to an excessive currency exchange rate risk, and which help minimize the effects of inflation within the destination country, at least during the time between booking the travel arrangements and commencement of the travel abroad. Various embodiments of the present invention advantageously provide systems, program product, and methods which enable a consumer preparing to travel abroad to convert funds at the time of booking into the currency of the travel destination ("destination currency"), to earn interest on those funds in the destination currency, preferably at a rate comparable to that available to foreign destination bank account holders, and to access the funds, for example, via a debit card, when abroad, without incurring additional per-transaction foreign exchange fees.

An example of a system for securing foreign destination currency funds for a traveler planning prospective travel in a selected foreign destination country commencing on a selected travel date, according to an embodiment of the present invention, can include a domestic financial institution server positioned at a domestic financial institution site and a remote user computer positioned remote from both the domestic financial institution server and a foreign destination country financial institution computer operably positioned in communication with the domestic financial institution server through a communication network. The foreign destination country financial institution computer is positioned at a foreign financial institution site located in the selected foreign destination country is in communication with the domestic financial institution server through the communication network.

The domestic financial institution server, according to an embodiment of the present invention, is configured to perform various operations to include, for example, the operations of receiving traveler personnel identification data (at a present or current date), a preselected future travel date, and indicia of the selected foreign destination country, collectively travel arrangement data, from the remote user computer through the communication network. Such data can be used to establish an interest-bearing foreign destination currency transaction account to thereby secure foreign destination currency funds for the traveler at a substantially current foreign exchange rate for use in the selected foreign destination country at the later selected travel date. The preselected travel date is generally substantially later than a date the travel arrangement data is received (e.g., at least one month later, but more typically, at least three months, and more preferably at least six months or more) and can be used by the domestic financial institution server to establish a target transaction account maturity date, e.g., at or near the preselected travel date. According to an embodiment of the system, the maturity date is selected by the financial institution 33 based upon the target travel date. According to another embodiment of the system, the maturity date is selected by the traveler.

The operations can also include determining the foreign exchange rate for conversion of domestic currency funds to the foreign destination currency funds for the foreign destination country and substantially all fees associated therewith responsive to the receiving of the indicia (e.g., identification) of the selected foreign destination country, presenting the determined foreign exchange rate and fees to the remote user computer through the communication network, receiving data including an indication of an amount (or value) of traveler desired foreign destination currency funds to open the interest-bearing foreign destination currency transaction account and at least indicia of a traveler selected domestic currency funds payment method, from the remote user computer through the communication network. The operations can also include establishing the interest-bearing foreign destination currency transaction account (to be funded by the domestic currency funds provided by the traveler) responsive to the receiving of the amount of traveler desired foreign destination currency funds to open the interest-bearing foreign destination currency transaction account and/or the receiving of the at least indicia of the traveler selected domestic currency funds payment method. The operations can further include establishing a maturity date for the interest-bearing foreign destination currency transaction account responsive to the preselected travel date, and responsive to passage of a date providing the traveler or otherwise enabling fund access to the foreign destination currency funds via at least one, but more preferably two debit cards having access to foreign destination currency funds on and after the maturity date.

The operation of providing fund access via the debit card or cards can include the operations of initiating the provision of the debit card to the traveler on a date immediately prior to the selected travel date, providing an indication of activation of the debit card, and providing an indication of a current transaction account balance including interest at maturity and/or the currently accrued interest if expected to be received prior to the date of maturity. The debit cards can each include a storage medium configured to store an account indicator provided to enable access to the foreign destination currency transaction account. As such, the operations can also include initiating storing of the account access indicator in the storage medium of the debit card responsive to the receiving of the indicia of receipt of the domestic currency funds provided by the traveler and/or the passage of a date associated with the preselected travel date to thereby activate the debit card.

The system can also include foreign destination currency transaction account computer program product stored on a tangible computer readable median provided as a separate deliverable, such as, for example, a removable disk or drive, and/or on a tangible computer readable median forming an integrated part of the system, such as, for example, the memory of the domestic financial institution server. The computer program product can include a set of instructions that, when executed by a computer such as, for example, the domestic financial institution server, cause the computer/server to perform various operations to secure foreign destination currency funds for the traveler for use in the selected foreign destination country.

The operations, according to an embodiment of the program product, can include, for example, receiving traveler personnel identification data for a traveler, receiving a later (future) preselected travel date established by the traveler, and receiving data identifying the selected foreign destination country (collectively travel arrangement data) from the remote user computer through the communication network to establish an interest-bearing foreign destination currency transaction account, and determining a current foreign exchange rate for conversion of domestic currency funds to the foreign destination currency funds for the foreign destination country and substantially all fees associated therewith responsive to the identification of the selected foreign destination country or receipt thereof. The operations can also include providing the determined foreign exchange rate and associated fees to the remote user computer through the communication network, receiving an indication of an amount of traveler desired foreign destination currency funds to open the interest-bearing foreign destination currency transaction account and at least indicia of a traveler selected domestic currency funds payment method from the remote user computer through the communication network, and establishing the interest-bearing foreign destination currency transaction account responsive to the receiving of the amount of traveler desired foreign destination currency funds to open the interest-bearing foreign destination currency transaction account and/or the receiving of the at least indicia of the traveler selected domestic currency funds payment method. The operations can further include establishing a maturity date for the interest-bearing foreign destination currency transaction account based upon or otherwise responsive to the preselected travel date, and providing the traveler fund access to the foreign destination currency funds via a debit card responsive to passage of a date associated with the preselected travel date.

A method of securing foreign destination currency funds for a traveler for prospective travel in a selected foreign destination country commencing on a preselected travel date, according to an embodiment of the present invention, can include a prospective traveler establishing travel arrangements to a selected country having the foreign destination currency as, for example, a primary currency, and estimating an amount of foreign destination currency desired during travel in the selected foreign destination country. The method can also include the step of providing to a domestic financial institution computer, and the computer receiving, an indication of the amount and source of domestic currency funds from a traveler to be used to fund a foreign destination currency transaction account. The transaction account is funded by domestic currency funds provided by the traveler according to various payment methodologies such as, for example, ACH, check, etc. The method can also include establishing an interest-bearing foreign destination currency transaction account responsive to the receiving of the indication of domestic currency funds to secure foreign destination currency funds for the traveler at an at least substantially current foreign exchange rate for use in a traveler selected foreign destination country at a substantially later preselected travel date (i.e., at least one month later, but more typically, at least three months, and more preferably at least six months or more). The transaction account can have an origination date, a maturity date at or near a preselected travel date established by the traveler, and an interest rate to be applied to the foreign destination currency funds at a specified rate for a period between the origination date of the transaction account and the maturity date.

The method can also include the step of converting the domestic currency funds to the foreign destination currency funds responsive to the receiving of the indication of provision of the domestic currency funds from the traveler and/or the establishing of the interest-bearing foreign destination currency transaction account. The foreign exchange rate for conversion of the domestic currency funds to the foreign destination currency funds is advantageously established at or near the origination date of the foreign destination currency transaction account to thereby hedge/lock in the current foreign exchange rate for foreign currency required at the future travel date.

The method can also include the step of providing a travel debit card or cards to the traveler on a delivery date immediately prior to the preselected travel date (i.e., no more than three weeks, but more typically within one or two weeks of the travel date) to enable access to the funds in the transaction account. Each debit card provides access to foreign destination currency funds in the transaction account on or after the maturity date, which can have a value substantially equal to a value of a balance of the destination currency transaction account at the maturity date. The value of the balance can include both principal and interest accrued on the transaction account between the origination date and the maturity date, which can be provided at a predetermined specified rate between an origination date of the transaction account and the maturity date.

According to an embodiment of the method, the steps can also include providing an on-line enrollment site to allow the traveler or a representative thereof to provide traveler information to establish the transaction account, presenting through the communication network a traveler information collection webpage form including personal identification data entry fields, a foreign destination country entry field, and/or a travel date entry field configured to receive the preselected travel date. The method can also include presenting an on-line acceptance webpage over the communication network. The on-line acceptance web page can include an exchange rate display field to display the foreign exchange rate (e.g., actual rate or conversion value) for conversion of the domestic currency funds to the foreign destination currency funds and substantially all fees associated therewith, and can include a foreign destination travel funds entry field configured to receive a value of traveler desired foreign destination currency in either domestic or foreign destination currency format. The method can also include providing one or more account maintenance web page(s), such as, for example, an on-line balance and replenishment web page including at least one field configured to indicate the current transaction account balance and at least one field configured to receive an amount or value of foreign destination currency funds requested by the traveler to replenish the transaction account, along with payment method selection and payment information and/or others.

Advantageously, various embodiments of the present invention to include those described above can be offered to consumers has an ancillary service to be provided by travel agents, airlines, banks and other common points of contact for a consumer, for example, as part of a marketing strategy to ensure the sale of a primary service—helping the consumer manage risk and ensure affordability of prospective travel abroad.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 9 is a schematic diagram of portions of a traveler information collection webpage according to an embodiment of the present invention;

FIG. 10 is a schematic diagram of portions of an on-line acceptance webpage according to an embodiment of the present invention.

DETAILED DESCRIPTION

Figure 1:
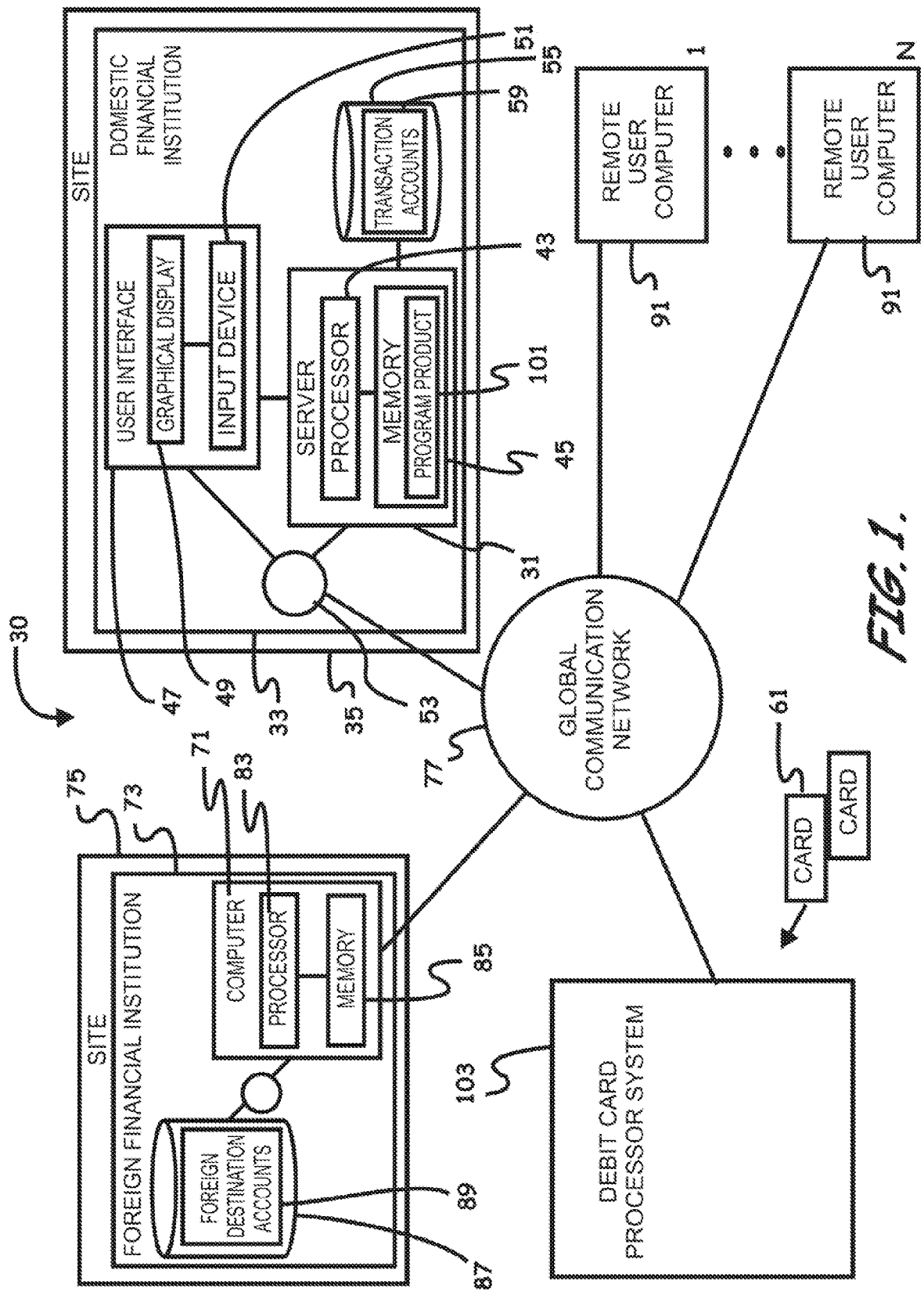
FIG. 1 is a schematic block diagram of a system for securing foreign destination currency funds for a traveler for prospective travel in a selected foreign destination country commencing on a preselected travel date according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout.

FIGS. 1-11 illustrate a system 30, program product 101, and methods which enable a consumer preparing travel arrangements to travel abroad: to convert domestic funds at or near the time of booking into the currency of the travel destination—effectively locking in the then current foreign exchange rate; to earn interest on those funds in the destination currency—effectively offsetting the affects of a potential loss in purchasing power of the travel destination currency in the travel destination country; and to access the funds, for example, via a debit card just in time, to readily access foreign destination currency without having to pay additional foreign exchange fees during travel abroad.

As described previously, if there is a significant amount of time between the date the travel arrangements are booked and the date the travel abroad is commenced, exchanging domestic currency funds for the currency of the travel destination ("foreign destination currency funds"), for example, can have a substantial foreign exchange rate risk component if the foreign exchange rate is volatile or becomes volatile between the date the travel is booked and the date the travel abroad is commenced. For example, assume a traveler having a budget of a maximum of 1700 units of domestic currency determines that 3000 units of foreign destination currency would be required for travel in the destination country, if commenced today, and the foreign exchange rate is currently 2.0000 units of foreign destination currency to 1.0000 unit of domestic currency, the traveler would determine that sufficient funds were available to schedule the travel, i.e., 1500 units of domestic currency with a surplus of 200 units. Further, assume that the travel arrangements are scheduled for a date that is six months later, that no funds are converted at the time of booking, and due to volatility, the exchange rate at the time of travel/funds conversion is 1.5000 units of destination currency to 1.0000 unit of domestic currency instead of 2.0000 units, such delay in procuring the required foreign destination currency would result in a requirement for 2000 units of destination currency to purchase the exact same goods and services previously requiring only 1500 units, of course, assuming zero inflation in the foreign destination country. In this scenario, the traveler would not have sufficient funds. If, however, the traveler had immediately "purchased" the destination currency at the time the traveler scheduled/booked the travel arrangements, the traveler would have had sufficient funds to complete the travel arrangements due to the "hedge" or a lock in of the exchange rate.

Exchanging domestic currency funds for the currency of the travel destination at a date well before the date the funds are actually needed, i.e., the future date the travel abroad is commenced, as a way of hedging against the foreign exchange rate risk, however, can have a substantial inflationary risk component if inflation is high, or becomes high, between the date the travel is booked/funds are exchanged and the date the travel abroad is commenced. For example, assume a traveler having a budget of a maximum of 1700 units of domestic currency, determines that 3000 units of destination currency would be required for travel in the destination country if commenced today, and the exchange rate is currently 2.0000 units of destination currency to 1.0000 unit of domestic currency, the traveler would determine that sufficient funds were available to schedule the travel, i.e., 1500 units of domestic currency, with a surplus of 200 units. Further, assume that the travel arrangements are scheduled for a date that is six months later, and that inflation in the destination country results in a requirement for 4500 units of destination currency to purchase the exact same goods and services. Assuming the foreign exchange rate at the travel date fully reflects the devaluation in the purchasing power of the foreign destination currency due to inflation (i.e., the exchange rate is now 3.0000 units to 1.0000 unit), if the traveler had immediately "purchased" the destination currency as hard currency at the time the traveler scheduled the travel arrangements, the traveler would have insufficient domestic currency funds (i.e., 200 units) to "purchase" the additional foreign destination currency funds (i.e., 1500 units) which would be needed to be purchased in order to complete the travel, as arranged, due to the devaluation of the destination currency. Accordingly, various embodiments of the present invention beneficially can account for both foreign currency risk and inflationary risk.

Figure 2:
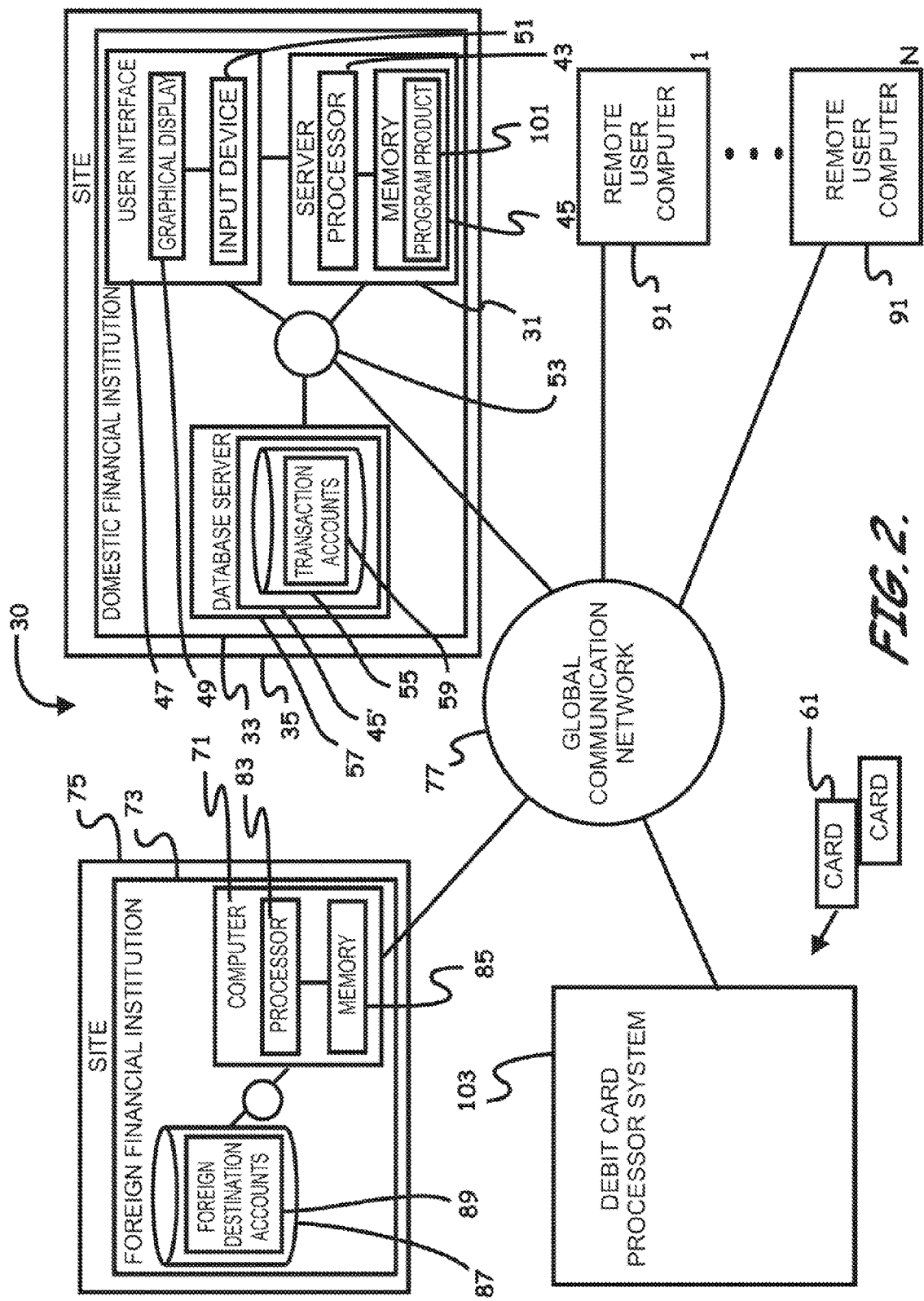
FIG. 2 is a schematic block diagram of a system for securing foreign destination currency funds for a traveler for prospective travel in a selected foreign destination country commencing on a preselected travel date according to another embodiment of the present invention.

Specifically, as perhaps best shown in FIGS. 1 and 2, an example of a system 30 for securing foreign destination currency funds for a traveler for prospective travel in a selected foreign destination country commencing on a selected travel date is provided. The system 30 can include a domestic financial institution computer defining a domestic financial institution server 31 positioned in a domestic financial institution 33 at a domestic financial institution site 35. The domestic financial institution 33 can be a bank, an entity operating like a bank, or other financial entity as understood by those skilled in the art. The domestic financial institution server 31 can contain or otherwise include a processor 43, and memory 45 coupled to the processor 43 to store software and database records therein, for example, connected directly to system/non-system components and/or networked to such components. The system 30 can also include a user interface 47, which can include a graphical display 49 for displaying graphical images, and a user input device 51 as known to those skilled in the art, to provide a user access to manipulate the software and database records. Accordingly, the user interface 47 can be either directly connected to the server 31, or through, e.g., a local area network 53, as known to those skilled in the art.

Note, the memory 45 can include volatile and nonvolatile memory known to those skilled in the art, including, for example, RAM, ROM, and magnetic or optical disks, just to name a few. Note also, it should be understood that the processor 43 refers to one or more processors either co-located or separately distributed. Further, it should also be understood that the preferred server configuration of server 31 is given by way of example and that other types of servers or computers configured according to various other methodologies known to those skilled in the art can be used. The server 31 shown schematically, for example, in FIGS. 1 and 2 represents a server or server cluster or server farm and is not limited to any individual physical server. The server 31 can be a personal computer capable of functioning as a server, a plurality of computers on a local area network, or a "traditional" server as known by those skilled in the art. The server site may be deployed as a server farm or server cluster managed by a serving hosting provider. The number of servers and their architecture and configuration may be increased based on usage, demand and capacity requirements for the system 30.

The system 30 can also include a database 55 stored, for example, in the memory 45 (internal or external, networked, or non-networked) of the server 31, as shown, for example, in FIG. 1, or stored in the memory 45' of a database server 57, as shown, for example, FIG. 2. The database 55 can contain data related to multiple consumer (traveler) transaction accounts 59, which, according to a preferred embodiment of the present invention, can be in the form of interest-bearing time deposits (e.g., certificate of deposit), having an established date of maturity, and normally a fixed interest rate, typically paid at maturity. Variable interest rates and other interest payout schemes, as known to those skilled in the art of banking, are, however, within the scope of the present invention. The transaction accounts 59 can collectively be in the form of accounts in one or more different types of foreign currency, or a local description thereof if the actual accounts are located at a different location. Note, although the reference to a transaction account 59 appears to imply a single account associated with a single entity, the term "transaction account" can encompass one or more accounts assigned to a single traveler entity (i.e., single or joint owner). For example, the "transaction account" can initially take the form of a time deposit account. As a practical application, at the time of maturity, either the time deposit account can be converted into, e.g., a typically non-interest-bearing checking (or savings) account accessible via a debit or other similar type card, such as debit card 61 (described later), or alternatively, the time deposit account can be closed with the funds in the account funds being transferred to, e.g., a typically non-interest-bearing checking account accessible via the debit 61 or other similar type card. Thus, the system 30 can beneficially provide a seamless consumer interface and service model.

The system 30 can also include at least one, but typically, a plurality of foreign destination country financial institution computers 71 each positioned in a separate foreign financial institution 73 at a respective separate foreign financial institution site 75 located in one or more selected foreign destination countries, and each in communication with the domestic financial institution server 31 through a global communication network 77. Similar to the domestic financial institution server 31, each foreign financial institution computer 71 can contain or otherwise include a processor 83, and memory 85 coupled to the processor 83, to store software and database records therein, for example, connected directly to system/non-system components and/or networked to such components. Each foreign financial institution 73 or site 75 can include sufficient hardware to support a database 87 including various foreign destination currency interest-bearing and non-interest-bearing accounts 89, which can be associated with the various transaction accounts 59.

The system 30 can also include a plurality of remote user computers 91 (labeled 1 to N) positioned remote from both the domestic financial institution server 31 and the one or more foreign destination country financial institution computers 71, and positioned in communication with the domestic financial institution server 31 through the global communication network 77. Each computer 91, typically in the form of a personal computer, is positioned at various locations including travel agent offices, airline offices or counters, at the domestic financial institution 33, at affiliated or satellite financial institutions or other common point of contact for a consumer, and can provide a would be traveler or representative an ability to create an interest-bearing transaction account 59 (e.g., travel CD/account) at the time the travel arrangements are made (or at any time at a bank branch), that can lock in their foreign exchange at the rate provided at the time of creation or origination of the account 59 (e.g., the present day) to hedge against undesired foreign exchange rate volatility.

The system 30 can also include foreign destination currency transaction account program product 101, for example, stored in the memory 45 of the domestic financial institution server 31, to secure or procure foreign destination currency funds for the traveler for use in the selected foreign destination country. The computer program product 101 can include a set of instructions that, when executed by the domestic financial institution server 31, cause the server to perform various operations required to both establish, and fund, the interest-bearing transaction accounts 59, described later. Note, the program product 101 can be in the form of microcode, programs, routines, and symbolic languages that provide a specific set or sets of ordered operations that control the functioning of the hardware and direct its operation, as known and understood by those skilled in the art. Note also, the program product 101, according to an embodiment of the present invention, need not reside in its entirety in volatile memory of the server 31, but can be selectively loaded, as necessary, according to various methodologies as known and understood by those skilled in the art of computer systems.

As noted above, for each set of traveler entities, the system 30 can include at least one, but preferably two, travel debit cards 61 provided to the traveler "entity," e.g., immediately prior to the booked travel date, which is, by its nature significantly after the origination date. Notably, the inventor has recognized that providing the cards just prior to the travel date is preferred, particularly when the origination date is substantially before the travel date, otherwise, the cards are more likely to be lost or misplaced. Note, although variations are within the scope of the present invention, the "immediately prior" delivery date for the cards 61 should be no more than approximately three weeks prior, but more typically, no more than one or two weeks prior to the travel date. Further, in order to maximize cost-effectiveness, the travel date should be substantially later than the origination date—i.e., at least approximately one month, but more typically, at least approximately three months, and more preferably at least approximately six to nine months or more after the origination/contract date, in order to better provide both the reduction in currency valuation risk and foreign exchange risk.

With respect to a single traveler entity, each provided debit card 61 can have access to foreign destination currency funds associated with the respective transaction account 59. The foreign destination currency funds accessible by the debit cards 61 can have a value substantially equal to the balance on the transaction account 59 at the maturity date. Beneficially, this value can include the interest accrued on the transaction account 59 between an origination date of the transaction account 59 and the maturity date, which, as noted above, can further beneficially act to offset any loss in purchasing power of the foreign destination currency resulting from inflation between the time of exchange ("purchase") of the foreign destination currency funds and commencement of the planned travel arrangements. Accordingly, the system 30 can further include a debit card processor system 103, as known to those skilled in the art, which can function to process debit card transactions in order to remove available funds from the transaction account 59 for transfer to the payee of the debit card 61.

ILLUSTRATIVE EXAMPLE

At the time a consumer books international travel, the travel agent, airline, tour operator, etc. can communicate an offer to the consumer (prospective traveler), which includes the ability to create an interest-bearing travel CD/account (e.g., transaction account 59) that locks in their foreign exchange at the present (today's) exchange rates and that pays interest. Through access to a web-enabled computer (e.g., computer 91), the web-based system 30 can allow the respective agent or representative to collect basic information on the consumer and either connect the consumer ("prospective traveler" or "traveler") to a call center or send the traveler, for example, an email with a link to an online enrollment site provided by the domestic financial institution server 31. Either the traveler or the agent or representative, on the traveler's behalf, can populate the on-line enrollment site, which can be somewhat similar to a travel card sign-up site.

At the time of sign-up, the traveler is provided a selection of one or more different types of foreign destination currencies, and notified of the respective foreign currency exchange rate and all foreign exchange and other related processing fees. The traveler can choose, for example, $Y of foreign destination currency which will prompt a calculation of the amount of $X of domestic currency required, or can choose $X of domestic currency required to obtain $Y of foreign destination currency. The traveler then determines how much currency the traveler desires to open the account with, and selects the desired payment methodology. I.e., the traveler either sends in a check or performs a bank transfer to open the account (e.g., ACH can be originated if the travel date is later than the ACH repudiation date).

The traveler defines the date of travel, which can become the maturity date for the foreign currency funds account. Alternatively, the maturity date can be established as the first business day prior to the travel date, or some other earlier date, based upon the traveler's date of travel. Upon receipt, the traveler-provided domestic currency funds are converted immediately into the desired foreign currency and held by the financial institution 33 in that currency on the traveler's behalf. Interest is paid to the traveler at a defined, specified rate, at "maturity."

Prior to the travel date, the traveler is provided, e.g., two personalized account access cards (e.g., debit cards 61) in the mail, for example, one week prior to travel. The cards allow the traveler to access the complete balance of the funds in the destination currency on or after the maturity date. The package containing the cards 61 can contain clear instructions for how to activate the cards 61, e.g., through a card processor system 103, and the current balance of foreign destination currency on the account 59, which should include the accrued or anticipated to be accrued interest. In another scenario, a supply of foreign destination hard currency representing a portion of the balance of the foreign destination currency account 59 can be provided with the card(s) 61.

According to the exemplary embodiment of the present invention, the system 30 is configured so that the traveler can travel and use the card 61 without additional foreign exchange fees. In a less preferred scenario, hard currency can be further provided at a foreign exchange location at the foreign travel destination country. In a preferred configuration, the traveler, nevertheless, is provided an ability to access travel card services like emergency cash, emergency cards, etc. worldwide. Further, the account balance can be periodically reviewed via the Internet. Further, foreign currency funds can be replenished via access to the enrollment web site and through access to a pre-established domestic currency account or a credit card, etc., associated with the traveler.

Upon return home, using the debit card 61, the traveler can access any remaining unspent funds. A check or ACH can be requested to have funds converted back to domestic currency and returned (for a fee); or a rollover account can be requested to allow the traveler to redeposit the funds into an interest-earning account foreign currency account 59.

Figure 3:
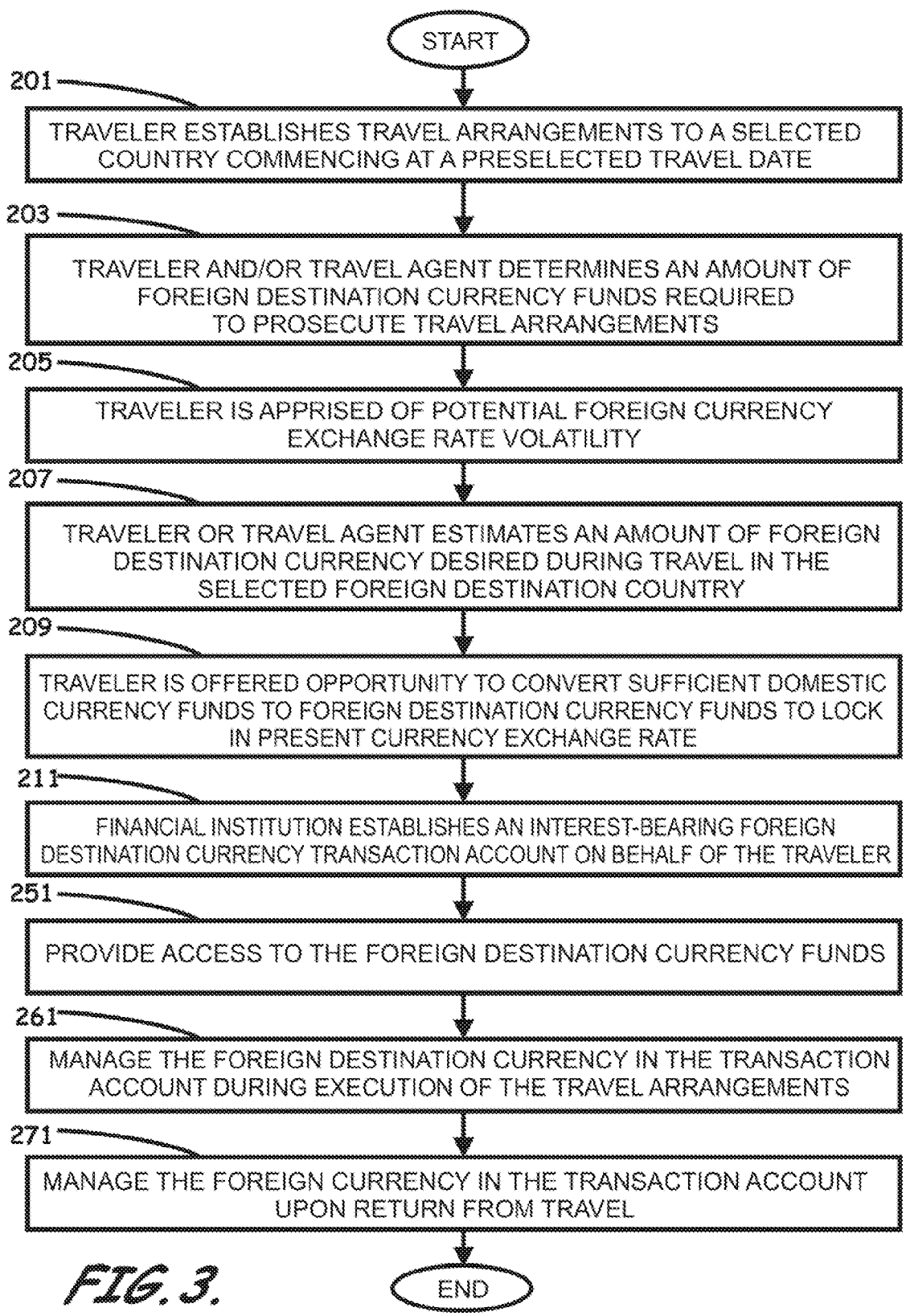
FIG. 3 is a schematic flow diagram of a method of securing foreign destination currency funds for a traveler for prospective travel in a selected foreign destination country commencing on a preselected travel date according to an embodiment of the present invention.

FIG. 3 provides a high-level flow diagram illustrating a method (and operations) for enabling a consumer preparing to travel abroad at a future date: to convert domestic currency funds at or near the time of booking into the foreign destination currency of the travel destination—effectively locking in the then current foreign exchange rate; to earn interest on those funds in the foreign destination currency—effectively offsetting the affects of a potential loss in purchasing power of the travel destination currency in the travel destination country; and to access the funds, for example, via a debit card (e.g., debit cards 61), when executing the travel abroad. For example, according to an embodiment of the present invention, the traveler establishes travel arrangements to a selected destination country commencing at a preselected travel date (block 201), and the traveler and/or travel agent determines an amount of foreign destination currency funds required to prosecute the travel arrangements (block 203). The traveler is then apprised of potential foreign currency exchange rate volatility (block 205). The traveler or travel agent estimates an amount of foreign destination currency desired during travel in the selected foreign destination country (block 207), and the travel agent offers the traveler the opportunity to convert sufficient domestic currency funds to foreign destination currency funds needed at one or more travel destinations to lock in the present foreign currency exchange rate (block 209).

If accepted, a financial institution 33, either affiliated or in contact with the travel agency, establishes an interest-bearing foreign destination currency transaction account 59 on behalf of the traveler (block 211). The account 59 can be characterized by having a user-selected maturity date at or near a preselected travel date established by the traveler (directly or via the travel agent), and associated interest on the foreign destination currency funds provided at a predetermined specified rate between an origination date of the transaction account and the maturity date. The account 59 is also characterized by being funded by domestic currency funds provided by the traveler at a foreign exchange rate (for conversion of the domestic currency funds to the foreign destination currency funds) established at or near the origination date, rather than at or near the travel date.

Figure 4:
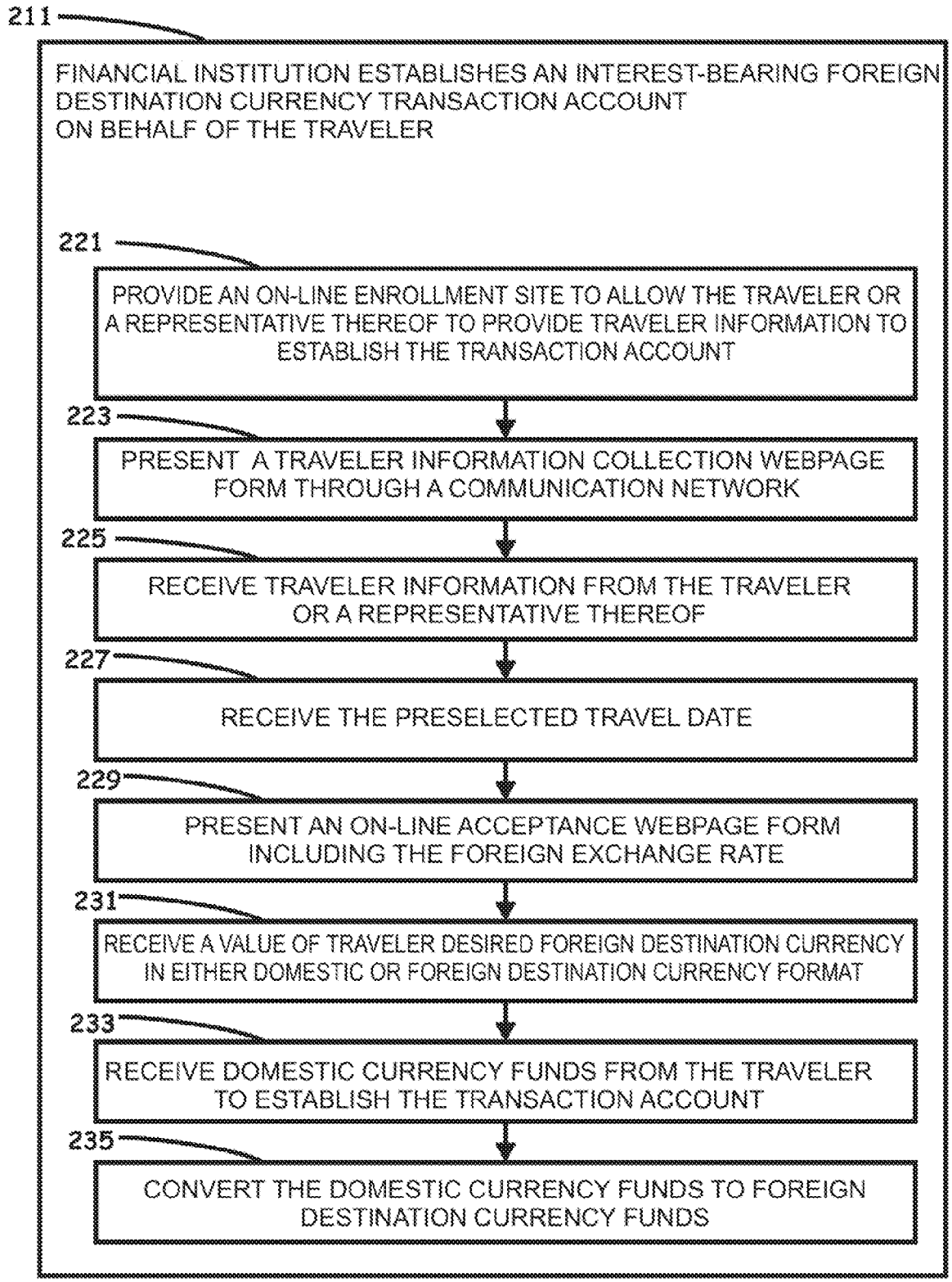
FIG. 4 is a schematic flow diagram illustrating establishing an interest-bearing foreign destination currency transaction account according to an embodiment of the present invention.

As perhaps best shown in FIG. 4, the step/operation of establishing an interest-bearing foreign destination currency transaction account of block 211 can include providing an on-line enrollment site to allow the traveler or a representative thereof to provide traveler information to establish the transaction account 59 (block 221), presenting a traveler information collection webpage form 301 (FIG. 9) through a communication network 77 (block 223) including multiple fields adapted to receive traveler information from the traveler or a representative thereof (block 225). The traveler information collection web page form 301 can provide traveler information to the financial institution 33 to originate the transaction account 59, and can include a travel date entry field 303 configured to receive the preselected travel date (block 227). As known and understood by those skilled in the art, the traveler information collection web page form 301 can be presented as a single web page or as multiple web pages, and can include, input fields for receiving traveler personnel identification data for a traveler including, for example: name 305, address 307-308, and affiliated travel agency 309, along with a foreign destination location drop-down menu input field 311, and/or others according to other variations as known to those skilled in the art.

Similarly, an on-line acceptance webpage 321 (FIG. 10) including a foreign exchange rate display field 323 providing the foreign exchange rate (quotation) for conversion of the domestic currency funds to the foreign destination currency funds and all or substantially all fees associated therewith and a foreign destination travel funds entry field 325 configured to receive a value of traveler desired foreign destination currency in either domestic or foreign destination currency format, can be presented (block 229). Responsively, the server 31 can receive a value of traveler desired foreign destination currency in either domestic or foreign destination currency format (block 231).

The domestic financial institution 33 receives the domestic currency funds provided the traveler to establish the transaction account 59 (block 233), and the domestic currency funds are converted to foreign destination currency funds, e.g., substantially immediately, responsive to origination of the transaction account 59 (block 235) according to at least one of the various methodologies known to those skilled in the art of banking.

Note, although typically initiated at a travel agent office or other type of facility, the on-line enrollment and the foreign exchange transaction process can be initiated at a financial institution computer associated with the financial institution server 31, and/or from a traveler computer 91 in communication with the financial institution server 31, for example, via the global communication network 77, along with other methodologies known to those skilled in the art of computer systems.

Figure 5:
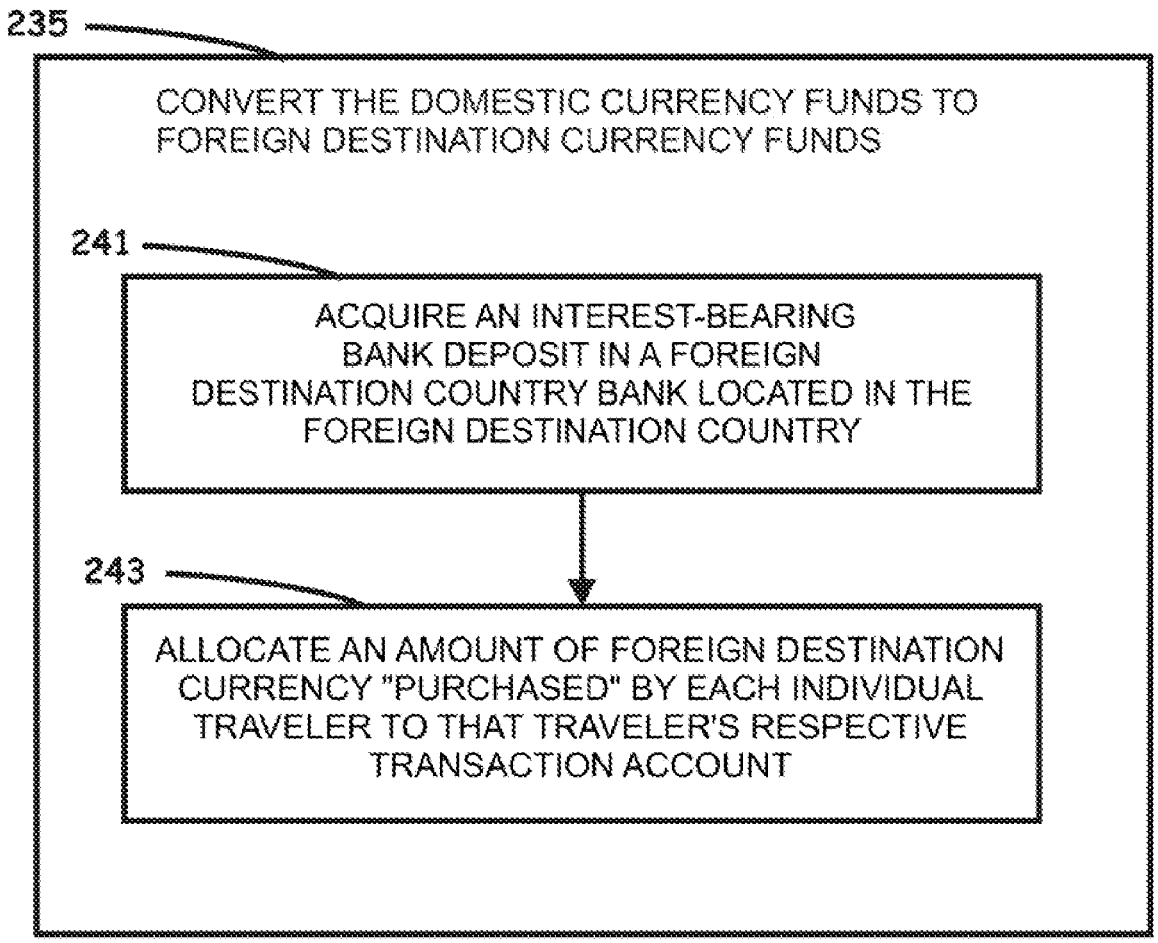
FIG. 5 is a schematic flow diagram illustrating converting domestic currency funds to foreign destination currency funds according to an embodiment of the present invention.

As perhaps best shown in FIG. 5, according to an embodiment of the present invention, the converting of foreign destination currency funds can include acquiring by the domestic financial institution 33, an interest-bearing bank deposit in a foreign destination country bank 73 located in the foreign destination country (block 241), for example, equal to an aggregate of the total amount of foreign destination currency purchased by each traveler for the respective day and having an interest rate pre-established by the foreign destination country bank 73; and can include allocating an amount of foreign destination currency "purchased" by each individual traveler to that traveler's respective transaction account 59 (block 243).

As further shown in FIG. 3, at or near the maturity date/travel date, the traveler is provided access to the foreign destination currency funds (block 251). The funds should beneficially include a value equal to the balance of the destination currency transaction account 59 at the maturity date. This value can include the combination of the balance of principal amount of foreign currency "purchased" and the balance of interest accrued on the transaction account 59 between the origination date and the maturity date, which can beneficially help compensate for inflation of the foreign currency with respect to the foreign destination country.

Figure 6:
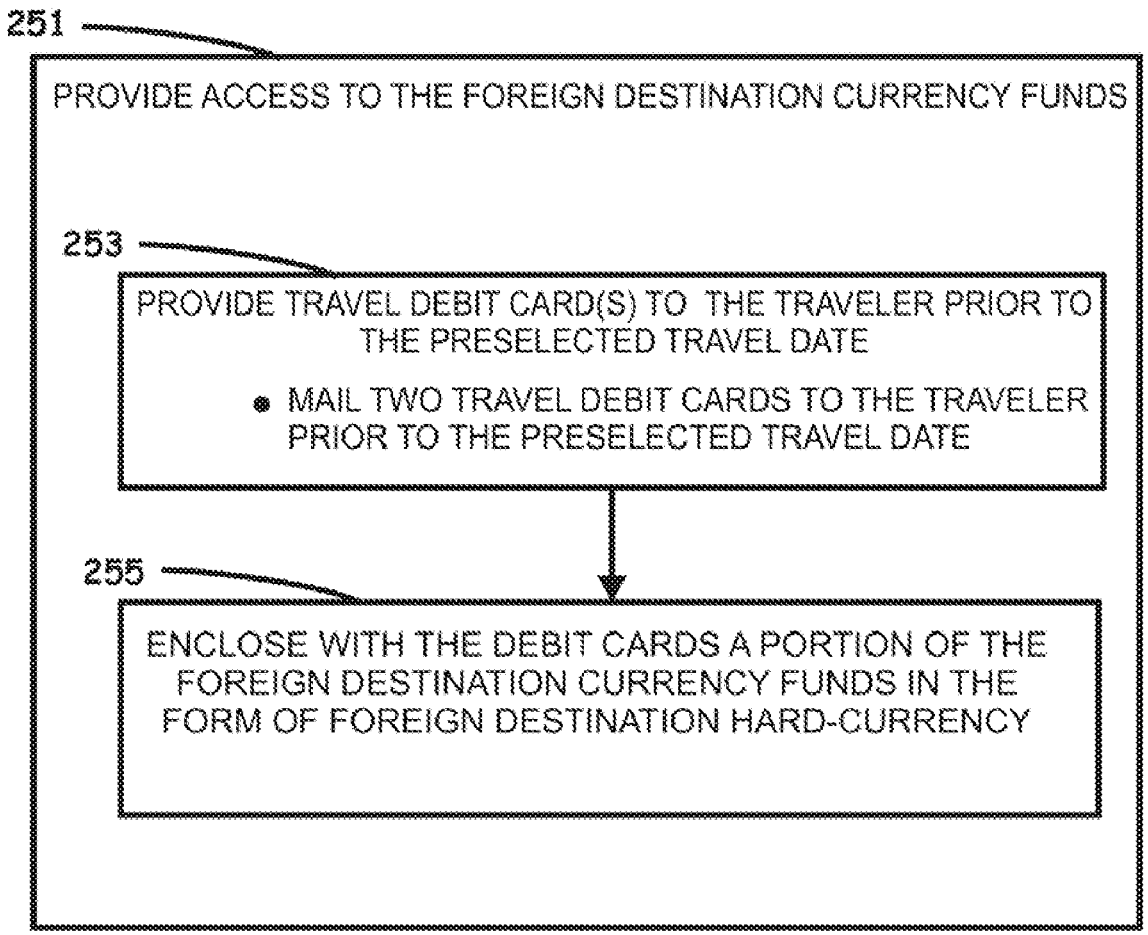
FIG. 6 is a schematic flow diagram illustrating providing access to the foreign destination currency funds according to an embodiment of the present invention.
Figure 7:
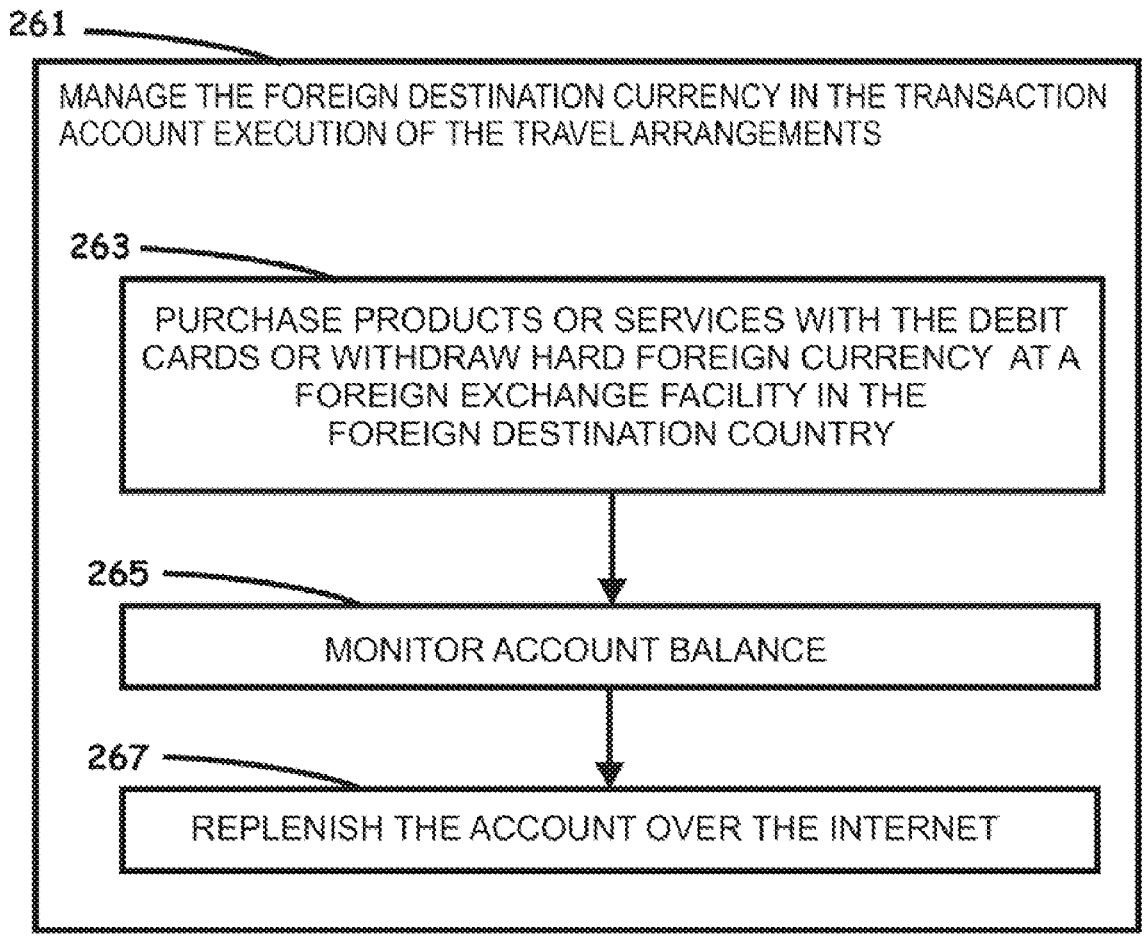
FIG. 7 is a schematic flow diagram illustrating managing foreign destination currency in a transaction account during execution of the travel arrangements according to an embodiment of the present invention.
Figure 8:
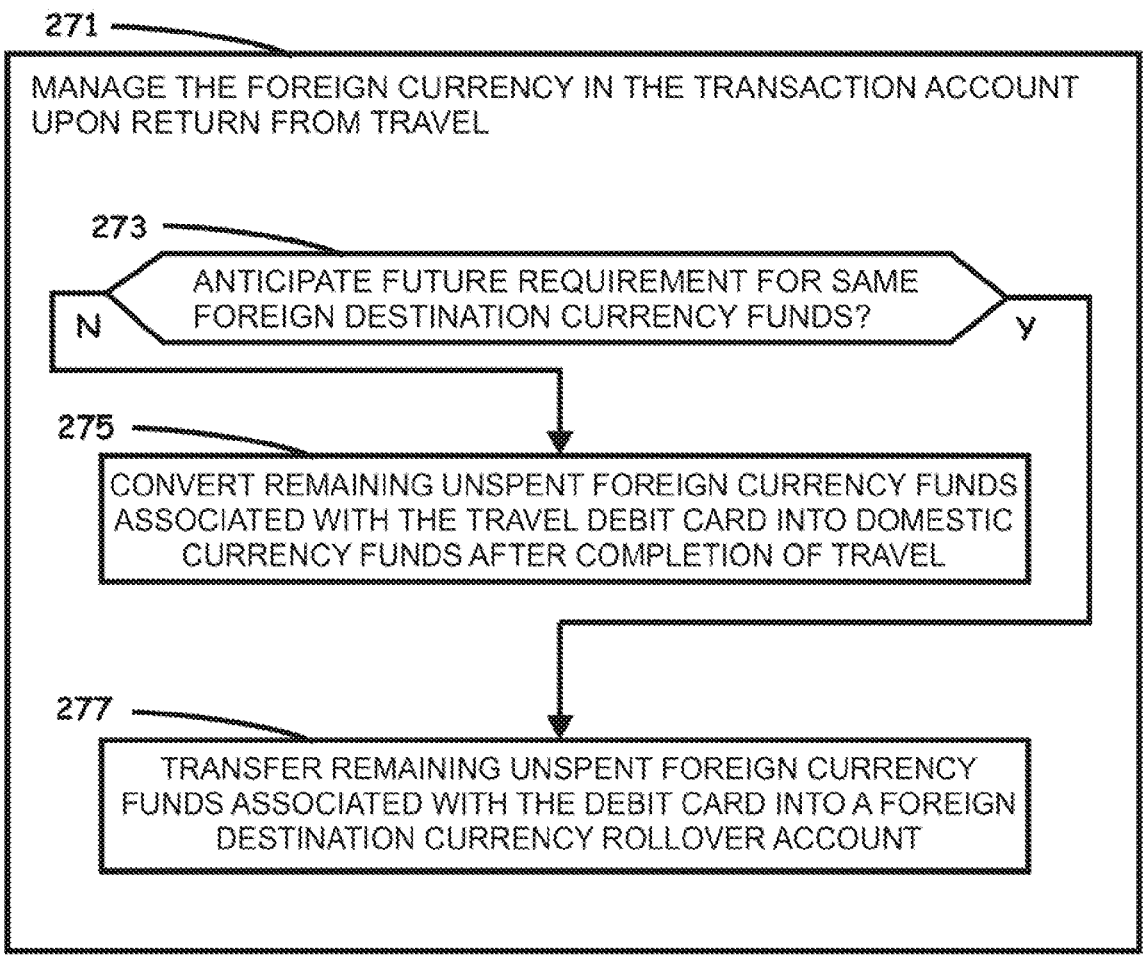
FIG. 8 is a schematic flow diagram illustrating managing foreign destination currency in the transaction account upon return from travel according to an embodiment of the present invention.
Figure 11:
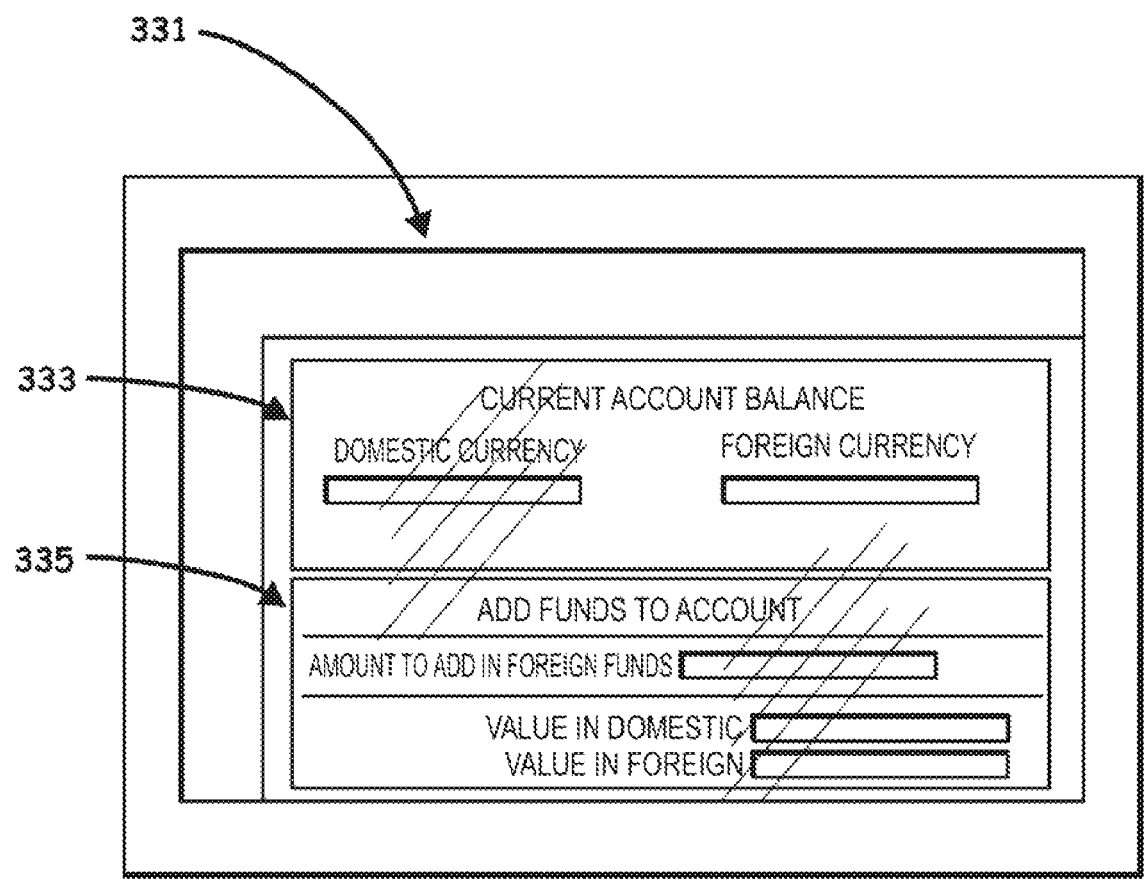
FIG. 11 is a schematic diagram of portions of an on-line balance and replenishment web page according to an embodiment of the present invention.

As perhaps best shown in FIG. 6, the step/operation of providing of access to the foreign destination funds at block 251 can include providing at least one, but preferably two, travel debit card(s) 61 to the traveler, prior to the preselected travel date (block 253). This can include mailing the travel debit cards 61 to the traveler, e.g., one week prior to the preselected travel date access to foreign destination currency funds. The value for amount of the foreign destination currency allocated to the debit cards 61 should be substantially equal to a value of a balance of the destination currency transaction account at the maturity date, and should include the interest accrued on the transaction account 59 between the origination date and the maturity date. Note, according to an alternate embodiment of the present invention, at least a portion of the interest can instead be allocated to a travel partner as an incentive to introduce the benefits of the system 30 to the prospective traveler. Further, optionally, according to an embodiment of the present invention, a portion of the foreign destination currency funds (in a form of foreign destination hard-currency) can accompany the debit cards in the mail (block 255).

Note, according to a preferred configuration, prior to providing the travel debit card(s) 61 to the traveler, an account activation indicator (e.g., primary account number or PAN) can be written to the magnetic strip, RFID, or other storage medium carried by each travel debit card 61 in order to prepare the cards for use by the traveler. In order to enhance security of the cards 61, the "preparation date" of the cards 61, however, should be no more than approximately one week prior to the "delivery date," but more typically, no more than approximately two business days or so prior. Further, the delivery date, itself, should be no more than approximately three weeks or so prior to the travel date, but more typically, no more than one or two weeks prior to the travel date, in order to reduce occurrences of lost or misplaced cards, which the inventor has recognized as often being an undesirable result when the cards 61 are sent before the traveler begins at least mental preparations to use them—particularly when the contract date is well before the travel date. According to an embodiment of the system 30, this preparation and delivery process is typically triggered by a date-time indicator associated with the maturity/travel date, but can also be responsive to receipt of the domestic currency funds funding the travel account 59.

As further shown in FIG. 3, embodiments of the present invention can include provisions for the traveler and/or domestic financial institution 33 to manage the foreign destination currency in the transaction account 59 during execution of the travel arrangements (block 261). As perhaps best shown in FIG. 7, this can include the traveler purchasing products or services with the debit cards 61, or withdrawing hard foreign currency at a foreign exchange facility, kiosk, bank, or other establishment or device in the foreign destination country capable of providing such hard-currency (block 263), without incurring additional foreign exchange fees. This can also include providing one or more account maintenance web page(s) to allow the traveler to monitor the account balance (block 265) and to replenish the transaction account 59 with foreign destination currency over the global communication network 77, e.g., Internet, with domestic currency funds (block 267). Such domestic currency funds can be, for example, allocated from a domestic currency account in the domestic financial institution 33, transferred from a domestic currency account in a affiliated or nonaffiliated financial institution having transfer capability, or provided via a credit card accessible to the traveler, of course, subject to any credit card finance charges, and subject to upfront foreign exchange transaction fees.

As further shown in FIG. 3, embodiments of the present invention can include provisions for the traveler and/or domestic financial institution 33 to manage the foreign destination currency in the transaction account 59 upon return from the travel abroad (block 271). As perhaps best shown in FIG. 8, depending upon whether or not the respective traveler anticipates future requirements for the same foreign destination currency (block 273), the traveler can access the one or more account maintenance web page(s) (not shown) to either convert any remaining unspent foreign currency funds associated with the travel debit card(s) 61 into domestic currency funds (block 275), or transfer any remaining unspent foreign currency funds associated with the debit card(s) 61 into a foreign destination currency rollover transaction account 59 (block 277) held by the domestic financial institution 33.

It is important to note that while embodiments of the present invention have been described in the context of a fully functional system, those skilled in the art will appreciate that the mechanism of at least portions of the present invention and/or aspects thereof are capable of being distributed in the form of a computer readable medium in a variety of forms storing a set of instructions for execution on a processor, processors, or the like, and that embodiments of the present invention apply equally regardless of the particular type of signal bearing media used to actually carry out the distribution. Examples of computer readable media include, but are not limited to: nonvolatile, hard-coded type media such as read only memories (ROMs), CD-ROMs, and DVD-ROMs, or erasable, electrically programmable read only memories (EEPROMs), recordable type media such as floppy disks, hard disk drives, CD-R/RWs, DVD-RAMs, DVD-R/RWs, DVD+R/RWs, HD-DVDs, memory sticks, mini disks, laser disks, Blu-ray disks, flash drives, and other newer types of memories, and certain types of transmission type media, such as, for example, digital and analog communication links capable of storing the set of instructions. Such media can contain, for example, both operating instructions and the operations instructions related to the program product 101 and the computer executable portions of the method steps according to the various embodiments of a method of, and system for, securing foreign destination currency funds for a traveler planning prospective travel in a selected foreign destination country commencing on a selected or preselected future travel date, described above.

Accordingly, an embodiment of the present invention can include a computer readable medium that is readable by a computer, e.g., server 31, to provide services of securing foreign destination currency funds for a traveler for prospective travel in a selected foreign destination country. The computer readable medium can include a set of instructions (e.g., program product 101 and/or above described method steps/operations in computer readable form) that, when executed by the server 31, cause the server 31 to perform the operations of providing an on-line enrollment site to allow the traveler or a representative thereof to provide the traveler personnel identification data to thereby originate an interest-bearing foreign destination currency transaction account 59, receiving traveler personnel identification data, a selected travel date, and indicia of the selected foreign destination country, through the communication network 77, from a remote user computer 91, to establish the transaction account 59.

The operations can also include determining the foreign exchange rate for conversion of domestic currency funds to the foreign destination currency funds for the foreign destination country and all fees associated therewith, and presenting an on-line acceptance webpage 321 (FIG. 10) to the remote user computer 91 through the communication network 77. The on-line acceptance web page can include the foreign exchange rate for conversion of the domestic currency funds to the foreign destination currency funds and the determined fees associated therewith, and a foreign destination travel funds entry field adapted to receive the amount or value of traveler desired foreign destination currency in either domestic or foreign destination currency format. Note, the form can also include fields for selection of different types of foreign currencies and/or different destination countries to aid in the selection of the proper foreign currency.

The operations can also include receiving an amount or value of traveler desired foreign destination currency funds to open the interest-bearing foreign destination currency transaction account 59, a user selected maturity date selected by the traveler at or near the selected travel date, and either funds transfer information or an indication of another selected payment method, e.g., check, credit card, etc., initiating converting the domestic currency funds received from the traveler into the foreign destination currency funds, e.g., substantially immediately, responsive to receipt thereof, and establishing the interest-bearing foreign destination currency transaction account 59 funded by the domestic currency funds provided by the traveler. According to embodiment of the present invention, the operations of establishing the account 59 and converting the domestic currency funds to the foreign destination currency funds can include initiating establishment of a domestic local account in foreign currency. Alternatively, the operation of establishing the account 59 can include initiating establishment of a Loro fund for the foreign financial institution 73, or verifying and allocating sufficient foreign currency funds in a domestic financial institution Nostro account held in the foreign financial institution 73, to the transaction account 59. Note, if a Nostro account is utilized and the Nostro account funds are insufficient or if additional funds are desired, the operations can include initiating and transferring sufficient funds.

The operations can further include determining an amount of interest on the foreign destination currency funds to be provided at a predetermined specified rate between an origination date of the transaction account and the maturity date, and enabling fund access to the foreign destination currency funds via a debit card(s) 61 responsive to passing of the maturity date or some other date associated therewith, and providing an indication of activation of the debit card and an indication of current account balance.

Still further, the operations can include providing one or more account maintenance web page(s), e.g., an on-line balance and replenishment web page 331 (FIG. 11), including at least one field 333 indicating the current transaction account balance and at least one field 335 configured to receive an amount or value of foreign destination currency funds requested by the traveler to replenish the transaction account 59, and, of course, payment method and payment information.

Beneficially, various embodiments of the present invention provide several unique features unheard of in conventional systems, and several easily recognizable features that can enhance acceptance by both consumers and financial institutions. As noted above, various embodiments of the system, program product, and methods offer the perspective traveler an ability to create an interest-bearing travel CD/account that locks in "today's" foreign exchange rate and pays potentially higher foreign currency based interest. This can be incorporated into the booking of international travel, or at any time at a properly configured bank branch/financial institution, or via a user personal computer. The travel agent, airline, tour operator, etc. can communicate the offer to the consumer (prospective traveler). A web-based portion of the system 30 can allow the travel/booking agent or representative to collect basic information on the would be traveler and to either connect the traveler to a call center or sends the traveler an email with a link to an online enrollment site. Beneficially, either the traveler, or a representative on the traveler's behalf, can populate the on-line enrollment site.

During "sign-up," the prospective traveler can be notified of the exchange rate of multiple currencies and all associated fees, to allow the traveler to convert domestic currency (e.g., US$) into foreign currency and hedge to lock in the present exchange rate. The traveler can determine the amount of foreign destination currency to open the account for, or the amount of domestic currency to open the account with. Settlement can occur in multiple currencies. Further, the traveler can define various parameters such as the date of travel, which can become the maturity date for the funds. Domestic currency funds provided by the traveler can be converted immediately into the desired currency and held in that currency, on the traveler's behalf, until the maturity date. Interest can be paid to the traveler at a defined, specified rate, preferably at "maturity." Penalty fees and reverse currency exchange fees may be applied for early withdrawal, to enhance traveler commitment.

Access to the account can be provided via personalized debit cards 61 provided to the traveler in the mail, e.g., one week prior to travel. The cards 61 can be configured to access funds in the destination currency and can have access to the complete balance. The card delivery package can contain clear instructions for how to activate the cards and what the balance is on the cards. At card issuance, the account can be set up on a card processor system, thus providing a seamless traveler interface and service model. The traveler can travel and use the cards 61, for example, without additional foreign exchange fees, and can be provided an ability to access travel card services like emergency cash, emergency cards, etc. worldwide. Upon return home, using the debit card 61, the traveler can access unspent funds. A check or ACH can be requested to have funds converted back to domestic "home" currency and returned, e.g., for a foreign exchange fee; or a rollover transaction account 59 can be offered to allow the traveler to redeposit the funds into an interest-earning account.

Additional features can include the provision of some of the travel funds as the foreign hard currency when the cards are mailed to the customer and the provision of access to hard currency at a foreign exchange location at the travel destination. The provision of services can be offered to travelers anywhere in the world, as travel currency is more about where one visits than where one starts. The system 30 can be configured to provide daily exchange rate values and an information tool for marketing representatives, and can include/provide an ability to receive domestic currency funds up front, and additional funds later, to a specified traveler account (the e.g., transaction account 59). The transaction account 59 can be configured with minimum and maximum hold times and values and an ability to present the interest on the foreign currency back to the traveler, an ability for the traveler to self-select a maturity date, a traveler self-service account site with monthly email statements, and an ability to present the current interest rate back to traveler/travel or representative at sign-up. The account 59 can be associated with a bank identification number (BIN) set-up in the new currency, and an MPM set up in the new currency.

Beneficial to the financial institution or bank, fees may remain competitive. Pricing can take the form of AAA pricing and for early foreign exchange can result in a movement of, for example, a 3% foreign exchange fee to up-front at the time of funds conversion. Other fees can remain roughly the same ($1.50 ATM domestic, $3 non-domestic, 3% if currency converts again, no additional charge for cross border, etc.). Further, the business model can allow for payment of commissions to distribution partners. Thus, profits and loss (P&L) can looks like AAA P&L with a longer float, a give away of any interest income, and 100% return for the foreign exchange.

In the drawings and specification, there has been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification and as defined in the appended claims. Therefore, it is to be understood that the invention is not to be limited to the illustrated embodiments disclosed, and that modifications and other embodiments are intended to be included within the scope of the appended claims.

This application is a divisional of and claims the benefit and priority of U.S. patent application Ser. No. 13/232,405, filed on Sep. 14, 2011, titled "System, Method, and Program Product For Foreign Currency Travel Account," which is a continuation of and claims the benefit and priority of U.S. patent application Ser. No. 12/554,659, filed on Sep. 4, 2009, U.S. Pat. No. 8,024,242, issued Sep. 20, 2011, titled "System, Methods, and Program Product for Foreign Currency Travel," which claims priority and the benefit of U.S. Provisional Patent Application No. 61/094,328, filed on Sep. 4, 2008, titled "System, Methods, and Program Product for Foreign Currency Travel." Each of these previous applications is incorporated herein by reference in its entirety.

The invention claimed is:

1. A computer for securing foreign destination currency funds for a traveler for prospective travel in a selected foreign destination country commencing on a preselected travel date thereby defining a domestic financial institution computer, the computer comprising:

one or more processors;

one or more input/output units for communicating with one or more remote computers; and non-transitory computer memory encoded with computer program operable by the one or more processors so that during operations thereof a domestic financial institution computer performs the following steps:

determining a foreign exchange rate for a selected foreign destination country and substantially all fees associated therewith responsive to receipt of data on a first date, the data including: a future travel date being substantially later than the first date and being established by a traveler or a representative thereof to thereby define a preselected travel date, indicia of the selected foreign destination country, and indicia of an amount of desired foreign destination currency funds;

determining an amount of domestic currency funds needed so that an interest-bearing foreign destination currency transaction account has at least the desired amount of foreign destination currency funds indicated in the data by the preselected travel date, the determination being based on the foreign exchange rate and anticipated interest accrual of foreign destination currency funds from an origination date to a maturity date; and indicating, via the one or more input/output units, to the traveler or the representative thereof the amount of domestic currency funds needed to open the interest-bearing foreign destination currency transaction account so that the transaction account will have at least the desired amount of foreign destination currency funds by the preselected travel date.

2. A domestic financial institution computer of claim 1, wherein the domestic financial institution computer is further configured to perform the step of:

establishing, responsive to receiving indicia of a traveler selected domestic currency funds payment method, the interest-bearing foreign destination currency transaction account to thereby procure foreign destination currency funds for the traveler, the transaction account configured to accrue interest at an interest rate from the origination date of the transaction account to the maturity date.

3. A domestic financial institution computer of claim 2, wherein the domestic financial institution computer is further configured to perform the step of: converting, by the domestic financial institution computer, domestic currency funds to foreign destination currency funds at the foreign exchange rate responsive to receiving domestic currency funds from the traveler or the representative thereof.

4. A domestic financial institution computer of claim 2, wherein the domestic financial institution computer is further configured to perform the steps of: initiating, by the domestic financial institution computer, one or more travel debit cards to have access to the foreign destination currency funds on and after the maturity date, a value of a balance of the destination currency transaction account at the maturity date to include interest accrued on the transaction account from the origination date to the maturity date.

5. A domestic financial institution computer of claim 4, wherein one or more travel debit cards includes a storage medium configured to store an account indicator provided to enable access to the interest-bearing foreign destination currency transaction account; and wherein the domestic financial institution computer is further configured to perform the steps of: initiating storing of the account access indicator in the storage medium of one or more debit cards responsive to receiving indicia of receipt of the domestic currency funds provided by the traveler or the representative thereof and passage of the preselected travel date to thereby activate the one or more debit cards.

6. A domestic financial institution computer of claim 3, wherein the domestic financial institution computer is further configured to perform the steps of: transferring remaining unspent foreign currency funds associated with the interest-bearing foreign destination currency transaction account into a foreign destination currency rollover account responsive to an indication of travel completion and an indication of desired funds disposition by the traveler or the representative thereof.

7. A domestic financial institution computer of claim 1, wherein the domestic financial institution computer is further configured to perform the steps of: providing an on-line balance and replenishment web page form including: at least one field indicating current foreign destination currency transaction account balance, and at least one field configured to receive an amount or value of foreign destination currency funds requested by the traveler to replenish the foreign destination currency transaction account, the value provided in at least one of the following formats: domestic currency funds format and foreign destination currency funds format.

8. A computer-implemented method for securing foreign destination currency funds for a traveler for prospective travel in a selected foreign destination country commencing on a preselected travel date, the method comprising:

determining, by a financial institution computer, a foreign exchange rate for a selected foreign destination country and substantially all fees associated therewith responsive to receipt of data on a first date, the data including: a future travel date being substantially later than the first date and being established by a traveler or a representative thereof to thereby define a preselected travel date, indicia of the selected foreign destination country, and indicia of an amount of desired foreign destination currency funds;

determining, by the financial institution computer, an amount of domestic currency funds needed so that an interest-bearing foreign destination currency transaction account has at least the desired amount of foreign destination currency funds indicated in the data by the preselected travel date, the determination being based on the foreign exchange rate and anticipated interest accrual of foreign destination currency funds from an origination date to a maturity date; and indicating, via a communication network, to the traveler or the representative thereof the amount of domestic currency funds needed to open the interest-bearing foreign destination currency transaction account so that the transaction account will have at least the desired amount of foreign destination currency funds by the preselected travel date.

9. A computer-implemented method of claim 8, wherein the method further comprises:

establishing, by the financial institution computer responsive to receiving indicia of a traveler selected domestic currency funds payment method, the interest-bearing foreign destination currency transaction account to thereby procure foreign destination currency funds for the traveler, the transaction account configured to accrue interest at an interest rate from the origination date of the transaction account to the maturity date.

10. A computer-implemented method of claim 9, wherein the method further includes the step of: converting, by the financial institution computer, domestic currency funds to foreign destination currency funds at the foreign exchange rate responsive to receiving domestic currency funds from the traveler or the representative thereof.

11. A computer-implemented method of claim 9, wherein the method further comprises: transferring, electronically by the financial institution computer, remaining unspent foreign currency funds associated with the interest-bearing foreign destination currency transaction account into a foreign destination currency rollover account responsive to an indication of travel completion and an indication of desired funds disposition by the traveler or the representative thereof.

* * * * *